United States Patent
Graves et al.

(10) Patent No.: US 9,596,525 B2
(45) Date of Patent: Mar. 14, 2017

(54) SYSTEM AND METHOD FOR MULTI-WAVELENGTH ENCODING

(71) Applicant: Huawei Technologies Co., Ltd., Shenzhen (CN)

(72) Inventors: Alan Frank Graves, Kanata (CA); Peter Ashwood-Smith, Gatineau (CA)

(73) Assignee: Huawei Technologies Co., LTD., Shenzhen (CN)

( * ) Notice: Subject to any disclaimer, the term of this patent is extended or adjusted under 35 U.S.C. 154(b) by 172 days.

(21) Appl. No.: 13/902,085

(22) Filed: May 24, 2013

(65) Prior Publication Data

US 2014/0161451 A1 Jun. 12, 2014

Related U.S. Application Data

(60) Provisional application No. 61/735,842, filed on Dec. 11, 2012.

(51) Int. Cl.
*H04J 14/00* (2006.01)
*H04Q 11/00* (2006.01)
(Continued)

(52) U.S. Cl.
CPC ..... *H04Q 11/0005* (2013.01); *H04Q 11/0062* (2013.01); *H04W 76/04* (2013.01);
(Continued)

(58) Field of Classification Search
CPC ........... H04Q 11/0005; H04Q 11/0062; H04Q 2011/0056; H04Q 2011/0081; H04Q 2011/0086; H04L 45/62; H04W 76/06
(Continued)

(56) References Cited

U.S. PATENT DOCUMENTS 5,848,055 A * 12/1998 Fedyk ................. H04L 12/5695
370/228
6,934,472 B2 * 8/2005 Chang ................ H04Q 11/0062
370/390
(Continued)

FOREIGN PATENT DOCUMENTS

CN 1343082 A 4/2002
CN 101056265 A 10/2007
(Continued)

OTHER PUBLICATIONS

PCT International Search Report and Written Opinion, International Application No. PCT/CN2013/089088, Applicant Huawei Technologies Co., LTD, dated Mar. 20, 2014, 13 pgs.

*Primary Examiner* — Ken N Vanderpuye
*Assistant Examiner* — Amritbir Sandhu
(74) *Attorney, Agent, or Firm* — Slater Matsil, LLP

(57) ABSTRACT

In one embodiment, a method for multi-wavelength encoding includes receiving an input optical packet stream having an address and data and encoding the address of the input optical packet stream producing an encoded address including a first group of symbols including a first selected symbol, where the first group of symbols has more than two symbols. The method also includes generating a first wavelength in accordance with the first selected symbol and generating an output optical packet stream having the data of the input optical packet and the first wavelength, where the first wavelength corresponds to the first selected symbol. Additionally, the method includes modulating the first wavelength with the input optical packet stream.

21 Claims, 25 Drawing Sheets

(51) Int. Cl.
*H04W 76/04* (2009.01)
*H04L 12/721* (2013.01)

(52) U.S. Cl.
CPC ...... *H04L 45/62* (2013.01); *H04Q 2011/0056* (2013.01); *H04Q 2011/0081* (2013.01); *H04Q 2011/0086* (2013.01)

(58) Field of Classification Search
USPC ............................................... 398/51, 45, 48
See application file for complete search history.

(56) References Cited

U.S. PATENT DOCUMENTS

| | | | |
|---|---|---|---|
| 7,177,544 B1* | 2/2007 | Wada ...................... | H04L 45/00 398/51 |
| 7,428,384 B2* | 9/2008 | Miyazaki ........................ | 398/49 |
| 7,590,359 B2* | 9/2009 | Kim et al. .................... | 398/186 |
| 7,706,695 B2* | 4/2010 | Hironishi et al. ............ | 398/188 |
| 7,968,248 B2 | 6/2011 | Liu et al. | |
| 7,983,560 B2* | 7/2011 | Maki ................... | H04J 14/0204 398/48 |
| 8,724,987 B2* | 5/2014 | Feuer .............................. | 398/45 |
| 9,054,827 B2* | 6/2015 | Ashwood-Smith | H04Q 11/0005 |
| 9,136,969 B2* | 9/2015 | Ashwood-Smith | H04Q 11/0005 |
| 9,178,644 B2* | 11/2015 | Ashwood-Smith | |
| 2002/0012139 A1* | 1/2002 | Willebrand ........ | H04B 10/1125 398/115 |
| 2002/0126349 A1* | 9/2002 | Sarraf ..................... | H04J 14/02 398/82 |
| 2002/0131120 A1* | 9/2002 | Araki ...................... | H04L 49/30 398/101 |
| 2002/0141018 A1* | 10/2002 | Chang et al. ................. | 359/139 |
| 2003/0133641 A1* | 7/2003 | Yoo ........................ | B82Y 20/00 385/14 |
| 2005/0180750 A1* | 8/2005 | Wada .................. | H04Q 11/0005 398/49 |
| 2006/0051092 A1* | 3/2006 | Way ................................ | 398/79 |
| 2008/0056715 A1* | 3/2008 | Akiyama ............ | H04J 14/0209 398/45 |
| 2008/0279556 A1* | 11/2008 | Yu et al. .......................... | 398/72 |
| 2011/0081149 A1* | 4/2011 | Wada et al. ..................... | 398/54 |
| 2011/0188856 A1* | 8/2011 | Feuer et al. ..................... | 398/45 |
| 2013/0195447 A1 | 8/2013 | Ashwood-Smith | |
| 2013/0195448 A1 | 8/2013 | Ashwood-Smith | |
| 2013/0195450 A1* | 8/2013 | Ashwood-Smith | H04Q 11/0005 398/49 |
| 2014/0161451 A1* | 6/2014 | Graves .................. | H04W 76/04 398/51 |
| 2014/0269351 A1* | 9/2014 | Graves .................... | H04L 49/10 370/250 |
| 2014/0334818 A1* | 11/2014 | Mehrvar ............ | H04Q 11/0066 398/51 |
| 2014/0334819 A1* | 11/2014 | Mehrvar ............ | H04Q 11/0003 398/51 |

FOREIGN PATENT DOCUMENTS

| | | |
|---|---|---|
| CN | 102624479 A | 8/2012 |
| EP | 1187508 A2 | 3/2002 |
| EP | 1170887 A2 | 9/2002 |
| JP | 200226874 A | 1/2002 |
| WO | 03065758 A1 | 8/2003 |

\* cited by examiner

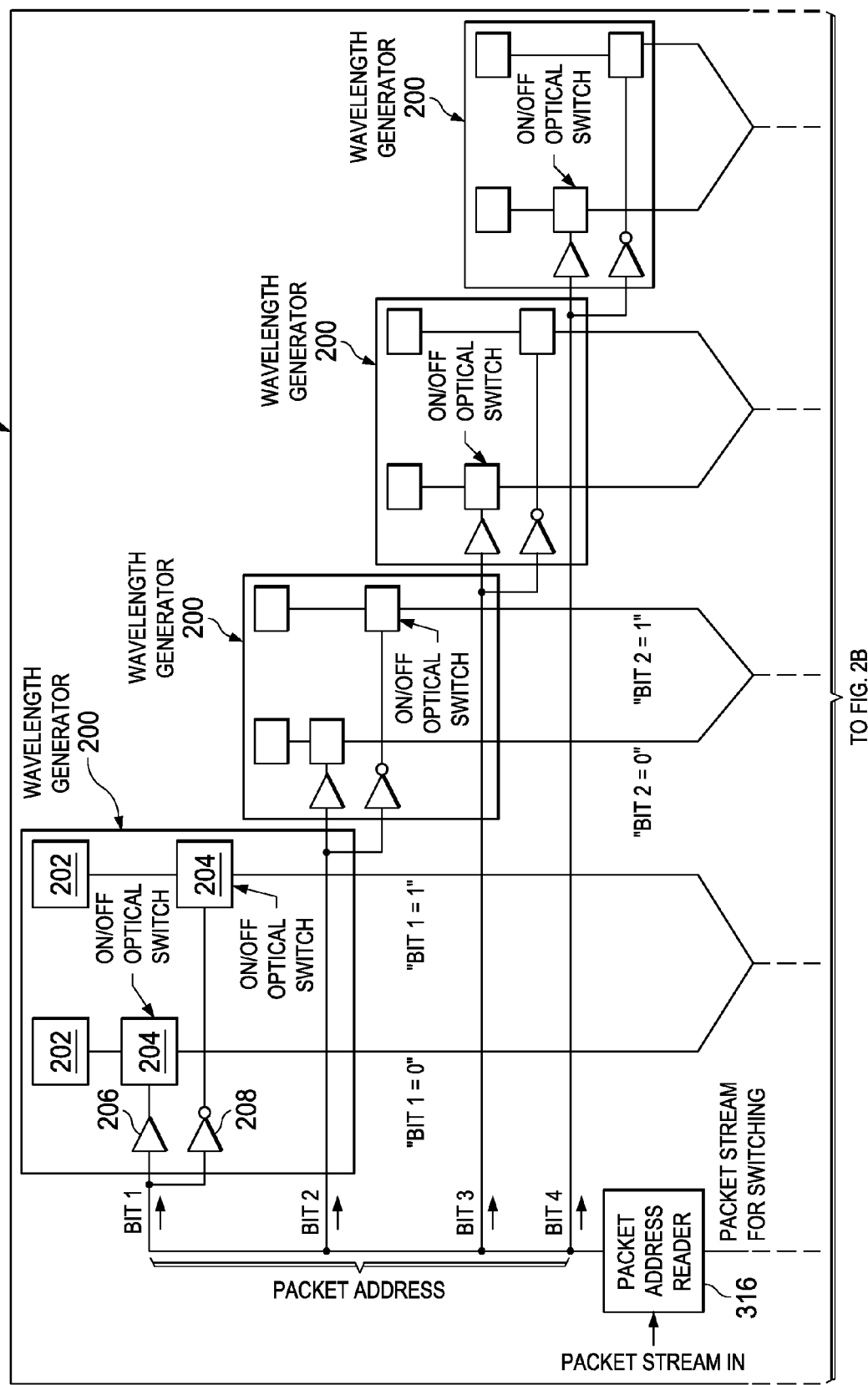

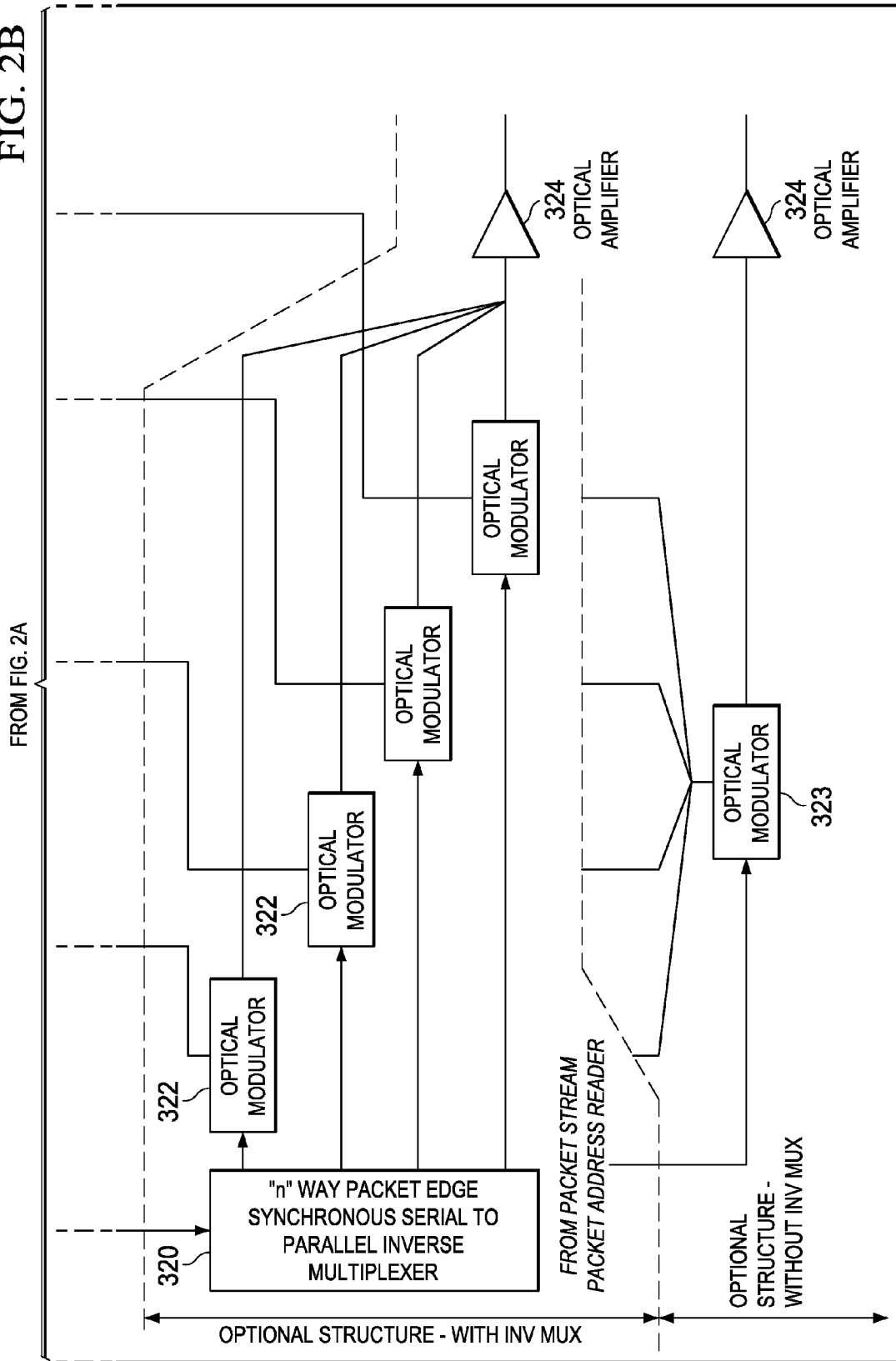

| "n" | "2n" | ADDRESS SPACE (LOCATIONS) | BIT RATE PER CARRIER AS PERCENTAGE OF INPUT BIT RATE |
|---|---|---|---|
| 1 | 2 | 2 | 100.00% |
| 2 | 4 | 4 | 50.00% |
| 3 | 6 | 8 | 33.33% |
| 4 | 8 | 16 | 25.00% |
| 5 | 10 | 32 | 20.00% |
| 6 | 12 | 64 | 16.67% |
| 7 | 14 | 128 | 14.29% |
| 8 | 16 | 256 | 12.50% |
| 9 | 18 | 512 | 11.11% |
| 10 | 20 | 1024 | 10.00% |
| 11 | 22 | 2048 | 9.09% |
| 12 | 24 | 4096 | 8.33% |
| 13 | 26 | 8192 | 7.69% |
| 14 | 28 | 16384 | 7.14% |
| 15 | 30 | 32768 | 6.67% |
| 16 | 32 | 65536 | 6.25% |
| 17 | 34 | 131072 | 5.88% |
| 18 | 36 | 262144 | 5.56% |
| 19 | 38 | 524288 | 5.26% |
| 20 | 40 | 1048576 | 5.00% |

| CODING BASE → | | BINARY | | TERNARY | | QUATERNARY | |
|---|---|---|---|---|---|---|---|
| NUMBER OF PARALLEL STREAMS (n) | DATA RATE AS PERCENTAGE OF COMPLETE DATA STREAM RATE | ADDRESS FIELD SIZE - BINARY | NUMBER OF CANDIDATE OPTICAL WAVELENGTHS REQUIRED | ADDRESS FIELD SIZE - TERNARY | NUMBER OF CANDIDATE OPTICAL WAVELENGTHS REQUIRED | ADDRESS FIELD SIZE - QUATERNARY | NUMBER OF CANDIDATE OPTICAL WAVELENGTHS REQUIRED |
| 2 | 50.0% | 4 | 4 | 9 | 6 | 16 | 8 |
| 3 | 33.3% | 8 | 6 | 27 | 9 | 64 | 12 |
| 4 | 25.0% | 16 | 8 | 81 | 12 | 256 | 16 |
| 5 | 20.0% | 32 | 10 | 243 | 15 | 1024 | 20 |
| 6 | 16.7% | 64 | 12 | 729 | 18 | 4096 | 24 |
| 7 | 14.3% | 128 | 14 | 2187 | 21 | 16384 | 28 |
| 8 | 12.5% | 256 | 16 | 6561 | 24 | 65536 | 32 |
| 9 | 11.1% | 512 | 18 | 19683 | 27 | 262144 | 36 |
| 10 | 10.0% | 1024 | 20 | 59049 | 30 | 1048576 | 40 |
| 11 | 9.1% | 2048 | 22 | 177147 | 33 | 4194304 | 44 |
| 12 | 8.3% | 4096 | 24 | 531441 | 36 | 16777216 | 48 |
| 13 | 7.7% | 8192 | 26 | 1594323 | 39 | 67108864 | 52 |
| 14 | 7.1% | 16384 | 28 | 4782969 | 42 | 268435456 | 56 |
| 15 | 6.7% | 32768 | 30 | 14348907 | 45 | 1.074E+09 | 60 |
| 16 | 6.3% | 65536 | 32 | 43046721 | 48 | 4.295E+09 | 64 |
| 17 | 5.9% | 131072 | 34 | 129140163 | 51 | 1.718E+10 | 68 |
| 18 | 5.6% | 262144 | 36 | 387420489 | 54 | 6.872E+10 | 72 |
| 19 | 5.3% | 524288 | 38 | 1.162E+09 | 57 | 2.749E+11 | 76 |
| 20 | 5.0% | 1048576 | 40 | 3.487E+09 | 60 | 1.1E+12 | 80 |

FIG. 4B  240

| | BASE 5 | | BASE 6 | | BASE 7 | | BASE 8 | |
|---|---|---|---|---|---|---|---|---|
| | ADDRESS FIELD SIZE - BASE 5 | NUMBER OF CANDIDATE OPTICAL WAVELENGTHS REQUIRED | ADDRESS FIELD SIZE - BASE 6 | NUMBER OF CANDIDATE OPTICAL WAVELENGTHS REQUIRED | ADDRESS FIELD SIZE - BASE 7 | NUMBER OF CANDIDATE OPTICAL WAVELENGTHS REQUIRED | ADDRESS FIELD SIZE - BASE 8 | NUMBER OF CANDIDATE OPTICAL WAVELENGTHS REQUIRED |
| | 25 | 10 | 36 | 12 | 49 | 14 | 64 | 16 |
| | 125 | 15 | 216 | 18 | 343 | 21 | 512 | 24 |
| | 625 | 20 | 1296 | 24 | 2401 | 28 | 4096 | 32 |
| | 3125 | 25 | 7776 | 30 | 16807 | 35 | 32768 | 40 |
| | 15625 | 30 | 46656 | 36 | 117649 | 42 | 262144 | 48 |
| | 78125 | 35 | 279936 | 42 | 823543 | 49 | 2097152 | 56 |
| | 390625 | 40 | 1679616 | 48 | 5764801 | 56 | 16777216 | 64 |
| | 1953125 | 45 | 10077696 | 54 | 40353607 | 63 | 1.34E+08 | 72 |
| | 9765625 | 50 | 60466176 | 60 | 2.82E+08 | 70 | 1.07E+09 | 80 |
| | 48828125 | 55 | 3.63E+08 | 66 | 1.98E+09 | 77 | 8.59E+09 | 88 |
| | 244140625 | 60 | 2.18E+09 | 72 | 1.38E+10 | 84 | 6.87E+10 | 96 |
| | 1.221E+09 | 65 | 1.31E+10 | 78 | 9.69E+10 | 91 | 5.5E+11 | 104 |
| | 6.104E+09 | 70 | 7.84E+10 | 84 | 6.78E+11 | 98 | 4.4E+12 | 112 |
| | 3.052E+10 | 75 | 4.7E+11 | 90 | 4.75E+12 | 105 | 3.52E+13 | 120 |
| | 1.526E+11 | 80 | 2.82E+12 | 96 | 3.32E+13 | 112 | 2.81E+14 | 128 |
| | 7.629E+11 | 85 | 1.69E+13 | 102 | 2.33E+14 | 119 | 2.25E+15 | 136 |
| | 3.815E+12 | 90 | 1.02E+14 | 108 | 1.63E+15 | 126 | 1.8E+16 | 144 |
| | 1.907E+13 | 95 | 6.09E+14 | 114 | 1.14E+16 | 133 | 1.44E+17 | 152 |
| | 9.537E+13 | 100 | 3.66E+15 | 120 | 7.98E+16 | 140 | 1.15E+18 | 160 |

FROM FIG. 4A

FIG. 5

| "m" | "n" | REQUIRED NUMBER OF CANDIDATE CARRIERS | BIT/RATE PER CARRIER (% OF ORIGINAL) | ADDRESS FIELD LIMIT AT THIS $m^n$ |
|---|---|---|---|---|
| 2 | 13 | 26 | 0.077 (BASELINE) | 8,192 |
| 3 | 8 | 24 | 0.125 (1.62 x BASE) | 6,561 |
| 4 | 7 | 28 | 0.142 (1.84 x BASE) | 16,384 |
| 5 | 6 | 30 | 0.167 (2.1 x BASE) | 15,625 |
| 6 | 5 | 30 | 0.2 (2.6 x BASE) | 7,776 |
| 8 | 5 | 40 | 0.2 (2.6 x BASE) | 32,768 |
| 10 | 4 | 40 | 0.25 (3.25 x BASE) | 10,000 |
| 20 | 3 | 60 | 0.33 (4.29 x BASE) | 8,000 |

FIG. 7

| ADDRESS VALUE | BINARY | TERNARY | QUATERNARY | QUINERNARY | OCTAL |
|---|---|---|---|---|---|
| 0 | 0000 | 000 | 00 | 00 | 00 |
| 1 | 0001 | 001 | 01 | 01 | 01 |
| 2 | 0010 | 002 | 02 | 02 | 02 |
| 3 | 0011 | 010 | 03 | 03 | 03 |
| 4 | 0100 | 011 | 10 | 04 | 04 |
| 5 | 0101 | 012 | 11 | 10 | 05 |
| 6 | 0110 | 020 | 12 | 11 | 06 |
| 7 | 0111 | 021 | 13 | 12 | 07 |
| 8 | 1000 | 022 | 20 | 13 | 10 |
| 9 | 1001 | 100 | 21 | 14 | 11 |
| 10 | 1010 | 101 | 22 | 20 | 12 |
| 11 | 1011 | 102 | 23 | 21 | 13 |
| 12 | 1100 | 110 | 30 | 22 | 14 |
| 13 | 1101 | 111 | 31 | 23 | 15 |
| 14 | 1110 | 112 | 32 | 24 | 16 |
| 15 | 1111 | 120 | 33 | 30 | 17 |
| 24 | 11000 | | | 44 | |
| 26 | 11010 | 222 | | | |
| 63 | 111111 | | | | 77 |

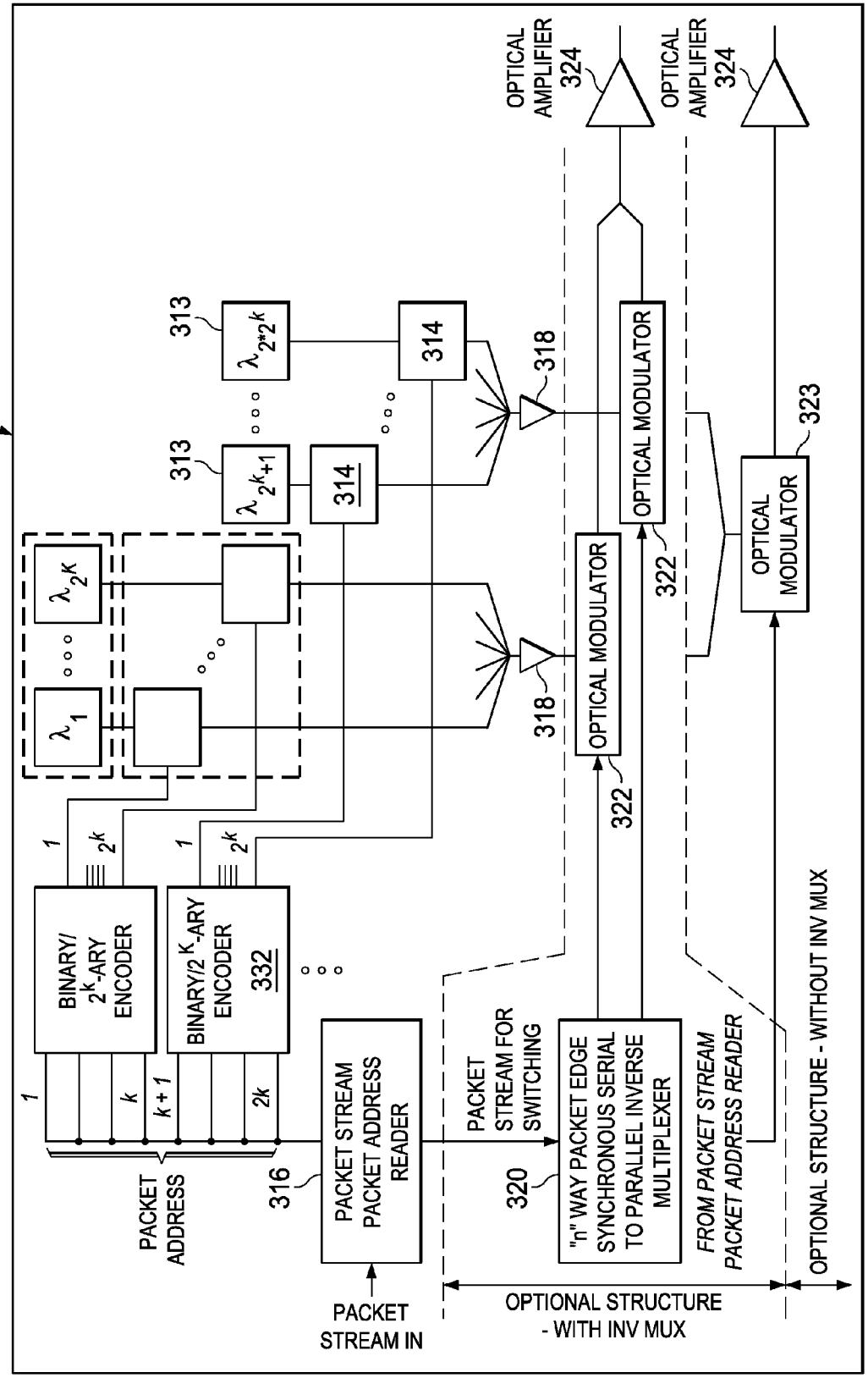

| NUMBER OF CANDIDATE WAVELENGTHS (M) | NUMBER OF WAVELENGTHS USED (n) | ADDRESS FIELD SIZE |
|---|---|---|
| 10 | 2 | 45 |
| 10 | 3 | 120 |
| 10 | 4 | 210 |
| 10 | 5 | 252 |
| 10 | 6 | 210 |
| 10 | 7 | 120 |
| 10 | 8 | 45 |
| 10 | 9 | 10 |
|  |  |  |
| 20 | 2 | 190 |
| 20 | 3 | 1140 |
| 20 | 4 | 4845 |
| 20 | 5 | 15504 |
| 20 | 6 | 38760 |
| 20 | 7 | 77520 |
| 20 | 8 | 125970 |
| 20 | 9 | 167960 |
| 20 | 10 | 184756 |
| 20 | 11 | 167960 |
| 20 | 12 | 125970 |
| 20 | 13 | 77520 |
| 20 | 14 | 38760 |
| 20 | 15 | 15504 |
| 20 | 16 | 4845 |
| 20 | 17 | 1140 |
| 20 | 18 | 190 |
| 20 | 19 | 20 |

| NUMBER OF CANDIDATE WAVELENGTHS (M) | NUMBER OF WAVELENGTHS USED (n) | ADDRESS FIELD SIZE |
|---|---|---|
| 30 | 2 | 435 |
| 30 | 3 | 4060 |
| 30 | 4 | 27405 |
| 30 | 5 | 142506 |
| 30 | 6 | 593775 |
| 30 | 7 | 2035800 |
| 30 | 8 | 5852925 |
| 30 | 9 | 14307150 |
| 30 | 10 | 30045015 |
| 30 | 11 | 54627300 |
| 30 | 12 | 86493225 |
| 30 | 13 | 119759850 |
| 30 | 14 | 145422675 |
| 30 | 15 | 155117520 |
| 30 | 16 | 145422675 |
| 30 | 17 | 119759850 |
| 30 | 18 | 86493225 |
| 30 | 19 | 54627300 |
| 30 | 20 | 30045015 |
| 30 | 21 | 14307150 |
| 30 | 22 | 5852925 |
| 30 | 23 | 2035800 |
| 30 | 24 | 593775 |
| 30 | 25 | 142506 |
| 30 | 26 | 27405 |
| 30 | 27 | 4060 |
| 30 | 28 | 435 |

FROM FIG. 11A

| | NUMBER OF CANDIDATE WAVELENGTHS (M) | NUMBER OF WAVELENGTHS USED (n) | ADDRESS FIELD SIZE |
|---|---|---|---|
| | 40 | 2 | 780 |
| | 40 | 4 | 91390 |
| | 40 | 6 | 3838380 |
| | 40 | 8 | 76904685 |
| | 40 | 10 | 847660528 |
| | 40 | 12 | 5586853480 |
| | 40 | 14 | 23206929840 |
| | 40 | 16 | 62852101650 |
| | 40 | 18 | 1.1338E+11 |
| | 40 | 20 | 1.37847E+11 |
| | 40 | 22 | 1.1338E+11 |
| FROM FIG. 11B | | | |
| | 60 | 2 | 1770 |
| | 60 | 4 | 487635 |
| | 60 | 6 | 50063860 |
| | 60 | 8 | 2558620845 |
| | 60 | 10 | 75394027566 |
| | 60 | 12 | 1.39936E+12 |
| | 60 | 14 | 1.73459E+13 |
| | 60 | 16 | 1.49608E+14 |
| | 60 | 18 | 9.2503E+14 |
| | 60 | 20 | 4.19184E+15 |
| | 60 | 22 | 1.41543E+16 |
| | 60 | 24 | 3.60524E+16 |
| | 60 | 26 | 6.98862E+16 |
| | 60 | 28 | 1.0372E+17 |
| | 60 | 30 | 1.18265E+17 |

| Option Number | Lambda 1 | Lambda 2 | Lambda 3 | Lambda 4 | Lambda 5 | Lambda 6 | Lambda 7 | Lambda 8 |
|---|---|---|---|---|---|---|---|---|
| \multicolumn{9}{c}{ALTERNATIVES FOR SELECTING ANY 4 FROM 8 WAVELENGTHS} |
| 1 | ✓ | ✓ | ✓ | ✓ |  |  |  |  |
| 2 | ✓ | ✓ | ✓ |  | ✓ |  |  |  |
| 3 | ✓ | ✓ | ✓ |  |  | ✓ |  |  |
| 4 | ✓ | ✓ | ✓ |  |  |  | ✓ |  |
| 5 | ✓ | ✓ | ✓ |  |  |  |  | ✓ |
| 6 | ✓ | ✓ |  | ✓ | ✓ |  |  |  |
| 7 | ✓ | ✓ |  | ✓ |  | ✓ |  |  |
| 8 | ✓ | ✓ |  | ✓ |  |  | ✓ |  |
| 9 | ✓ | ✓ |  | ✓ |  |  |  | ✓ |
| 10 | ✓ |  | ✓ | ✓ | ✓ |  |  |  |
| 11 | ✓ |  | ✓ | ✓ |  | ✓ |  |  |
| 12 | ✓ |  | ✓ | ✓ |  |  | ✓ |  |
| 13 | ✓ |  | ✓ | ✓ |  |  |  | ✓ |
| 14 |  | ✓ | ✓ | ✓ | ✓ |  |  |  |
| 15 |  | ✓ | ✓ | ✓ |  | ✓ |  |  |
| 16 |  | ✓ | ✓ | ✓ |  |  | ✓ |  |
| 17 |  | ✓ | ✓ | ✓ |  |  |  | ✓ |
| 18 | ✓ | ✓ |  |  | ✓ | ✓ |  |  |
| 19 | ✓ | ✓ |  |  | ✓ |  | ✓ |  |
| 20 | ✓ | ✓ |  |  | ✓ |  |  | ✓ |
| 21 | ✓ | ✓ |  |  |  | ✓ | ✓ |  |
| 22 | ✓ | ✓ |  |  |  | ✓ |  | ✓ |
| 23 | ✓ | ✓ |  |  |  |  | ✓ | ✓ |
| 24 | ✓ |  | ✓ |  | ✓ | ✓ |  |  |
| 25 | ✓ |  | ✓ |  | ✓ |  | ✓ |  |
| 26 | ✓ |  | ✓ |  | ✓ |  |  | ✓ |
| 27 | ✓ |  | ✓ |  |  | ✓ | ✓ |  |
| 28 | ✓ |  | ✓ |  |  | ✓ |  | ✓ |
| 29 | ✓ |  | ✓ |  |  |  | ✓ | ✓ |
| 30 | ✓ |  |  | ✓ | ✓ | ✓ |  |  |
| 31 | ✓ |  |  | ✓ | ✓ |  | ✓ |  |
| 32 | ✓ |  |  | ✓ | ✓ |  |  | ✓ |
| 33 | ✓ |  |  | ✓ |  | ✓ | ✓ |  |
| 34 | ✓ |  |  | ✓ |  | ✓ |  | ✓ |
| 35 | ✓ |  |  | ✓ |  |  | ✓ | ✓ |

TO FIG. 14B

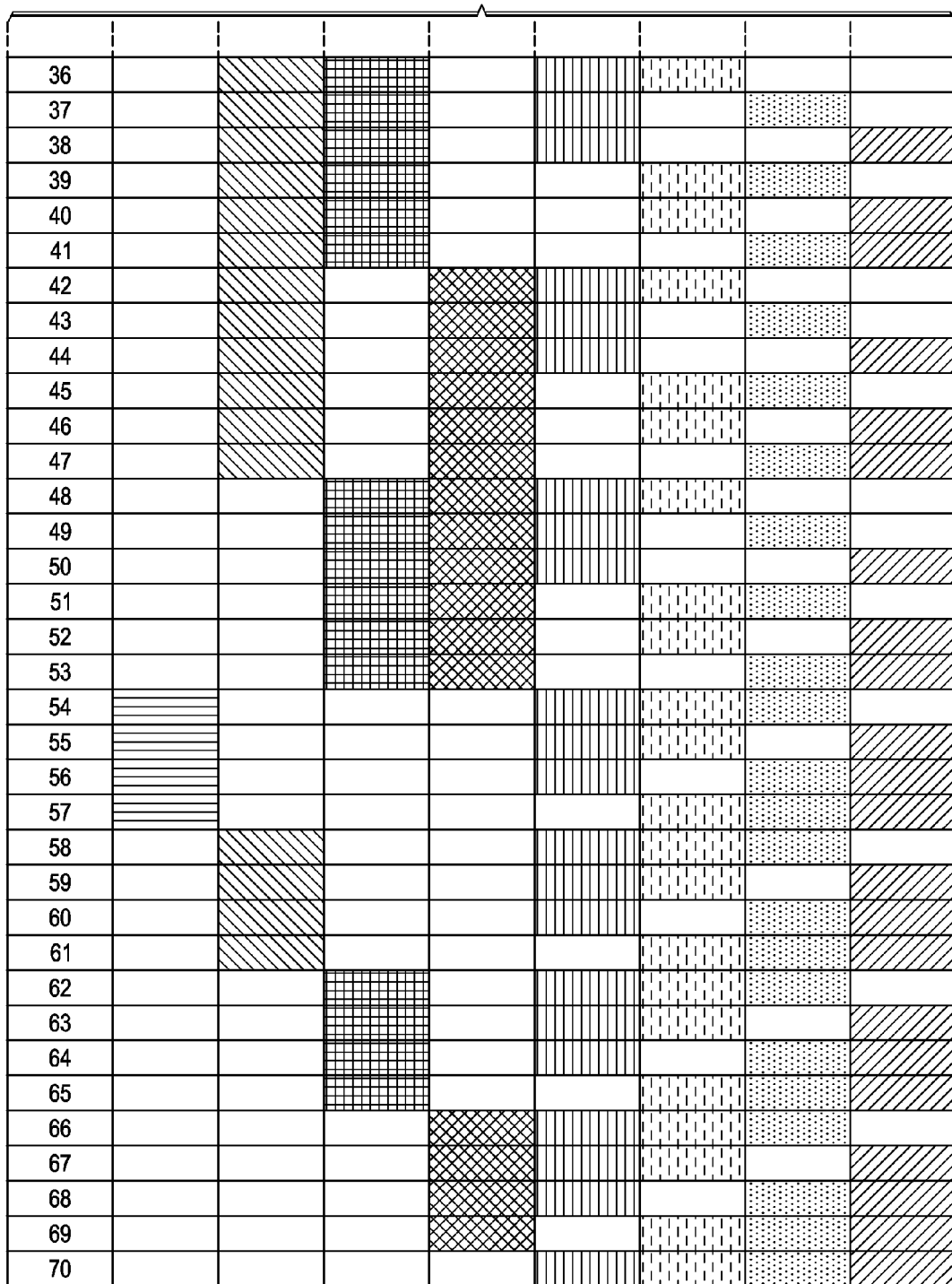

| INDIVIDUAL n/2 FROM M/2 SELECTION ||||||
|---|---|---|---|---|---|
| NUMBER OF CANDIDATE WAVELENGTHS (M/2) | NUMBER OF WAVELENGTHS USED (n/2) | ADDRESS FIELD SIZE | NUMBER OF CANDIDATE WAVELENGTHS (M/2) | NUMBER OF WAVELENGTHS USED (n/2) | ADDRESS FIELD SIZE |
| 10 | 2 | 45 | 30 | 2 | 435 |
| 10 | 3 | 120 | 30 | 3 | 4,060 |
| 10 | 4 | 210 | 30 | 4 | 27,405 |
| 10 | 5 | 252 | 30 | 5 | 142,506 |
| 10 | 6 | 210 | 30 | 6 | 593,775 |
| 10 | 7 | 120 | 30 | 7 | 2,035,800 |
| 10 | 8 | 45 | 30 | 8 | 5,852,925 |
| 10 | 9 | 10 | 30 | 9 | 14,307,150 |
| 20 | 2 | 190 | 40 | 2 | 780 |
| 20 | 3 | 1,140 | 40 | 3 | 9,880 |
| 20 | 4 | 4,845 | 40 | 4 | 91,390 |
| 20 | 5 | 15,504 | 40 | 5 | 658,008 |
| 20 | 6 | 38,760 | 40 | 6 | 3,838,380 |
| 20 | 7 | 77,520 | 40 | 7 | 18,643,560 |
| 20 | 8 | 125,970 | 40 | 8 | 76,904,685 |
| 20 | 9 | 167,960 | 40 | 9 | 273,438,880 |

FROM FIG. 15A

| COMBINING TWO n/2 FROM M/2 BLOCKS (REQUIRES 2 x n/2 FROM M/2 DECODERS INSTEAD OF ONE n FROM M DECODER) | | | | | |
|---|---|---|---|---|---|
| NUMBER OF CANDIDATE WAVELENGTHS (M) | NUMBER OF WAVELENGTHS USED (n) | ADDRESS FIELD SIZE | NUMBER OF CANDIDATE WAVELENGTHS (M) | NUMBER OF WAVELENGTHS USED (n) | ADDRESS FIELD SIZE |
| 20 | 4 | 2,025 | 60 | 4 | 189,225 |
| 20 | 6 | 14,400 | 60 | 6 | 16,483,600 |
| 20 | 8 | 44,100 | 60 | 8 | 751,034,025 |
| 20 | 10 | 63,504 | 60 | 10 | 2.031E+10 |
| 20 | 12 | 44,100 | 60 | 12 | 3.526E+11 |
| 20 | 14 | 14,400 | 60 | 14 | 4.144E+12 |
| 20 | 16 | 2,025 | 60 | 16 | 3.426E+13 |
| 20 | 18 | 100 | 60 | 18 | 2.047E+14 |
| | | | | | |
| 40 | 4 | 36,100 | 80 | 4 | 608,400 |
| 40 | 6 | 1,299,600 | 80 | 6 | 97,614,400 |
| 40 | 8 | 23,474,025 | 80 | 8 | 8.352E+09 |
| 40 | 10 | 240,374,016 | 80 | 10 | 4.330E+11 |
| 40 | 12 | 1.502E+09 | 80 | 12 | 1.473E+13 |
| 40 | 14 | 6.009E+09 | 80 | 14 | 3.476E+14 |
| 40 | 16 | 1.587E+10 | 80 | 16 | 5.914E+15 |
| 40 | 18 | 2.821E+10 | 80 | 18 | 7.477E+16 |

| INDIVIDUAL n/k FROM M/k SELECTION | | | COMBINING TWO n/2 FROM M/2 BLOCKS (REQUIRES 2 x n/2 FROM M/2 DECODERS INSTEAD OF ONE n FROM M DECODER) | | |
|---|---|---|---|---|---|
| NUMBER OF CANDIDATE WAVELENGTHS (M/2) | NUMBER OF WAVELENGTHS USED (n/2) | ADDRESS FIELD SIZE | NUMBER OF CANDIDATE WAVELENGTHS (M) | NUMBER OF WAVELENGTHS USED (n) | ADDRESS FIELD SIZE |
| 10 | 2 | 45 | 20 | 4 | 2,025 |
| 10 | 3 | 120 | 20 | 6 | 14,400 |
| 10 | 4 | 210 | 20 | 8 | 44,100 |
| 10 | 5 | 252 | 20 | 10 | 63,504 |
| | | | | | |
| 20 | 2 | 190 | 40 | 4 | 36,100 |
| 20 | 3 | 1,140 | 40 | 6 | 1,299,600 |
| 20 | 4 | 4,845 | 40 | 8 | 23,474,025 |
| 20 | 5 | 15,504 | 40 | 10 | 240,374,016 |
| 20 | 6 | 38,760 | 40 | 12 | 1.502E+09 |
| 20 | 7 | 77,520 | 40 | 14 | 6.009E+09 |
| 20 | 8 | 125,970 | 40 | 16 | 1.587E+10 |
| 20 | 9 | 167,960 | 40 | 18 | 2.821E+10 |
| 20 | 10 | 184,756 | 40 | 20 | 3.413E+10 |

| | COMBINING THREE n/3 FROM M/3 BLOCKS (REQUIRES 3 x n/3 FROM M/3 DECODERS INSTEAD OF ONE n FROM M DECODER) | | | COMBINING FOUR n/4 FROM M/4 BLOCKS (REQUIRES 4 x n/4 FROM M/4 DECODERS INSTEAD OF ONE n FROM M DECODER) | | |
|---|---|---|---|---|---|---|
| | NUMBER OF CANDIDATE WAVELENGTHS (M) | NUMBER OF WAVELENGTHS USED (n) | ADDRESS FIELD SIZE | NUMBER OF CANDIDATE WAVELENGTHS (M) | NUMBER OF WAVELENGTHS USED (n) | ADDRESS FIELD SIZE |
| | 30 | 6 | 91,125 | 40 | 8 | 4,100,625 |
| | 30 | 9 | 1,728,000 | 40 | 12 | 207,360,000 |
| | 30 | 12 | 9,261,000 | 40 | 16 | 1,944,810,000 |
| | 30 | 15 | 16,003,008 | 40 | 20 | 4,032,758,016 |
| | 60 | 6 | 6,859,000 | 80 | 8 | 1,303,210,000 |
| | 60 | 9 | 1,481,544,000 | 80 | 12 | 1.689E+12 |
| | 60 | 12 | 1.137E+11 | 80 | 16 | 5.510E+14 |
| | 60 | 15 | 3.727E+12 | 80 | 20 | 5.778E+16 |
| | 60 | 18 | 5.823E+13 | 80 | 24 | 2.257E+18 |
| | 60 | 21 | 4.658E+14 | 80 | 28 | 3.611E+19 |
| | 60 | 24 | 1.999E+15 | 80 | 32 | 2.518E+20 |
| | 60 | 27 | 4.738E+15 | 80 | 36 | 7.958E+20 |
| | 60 | 30 | 6.307E+15 | 80 | 40 | 1.165E+21 |

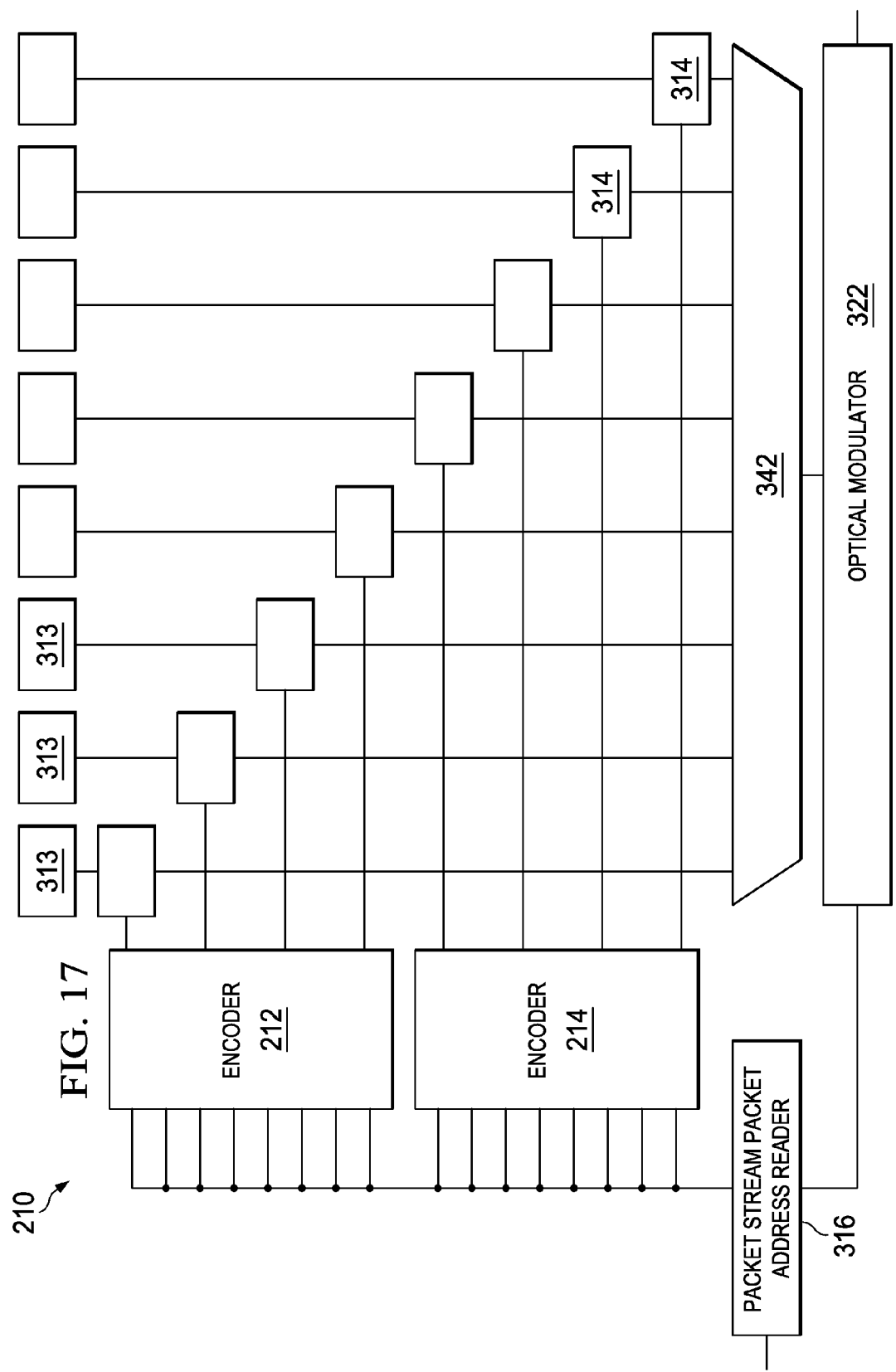

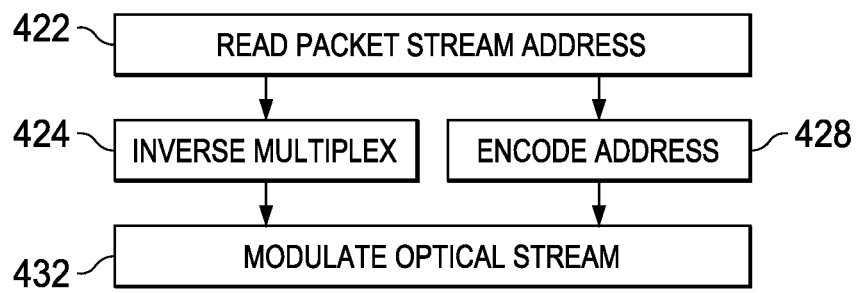
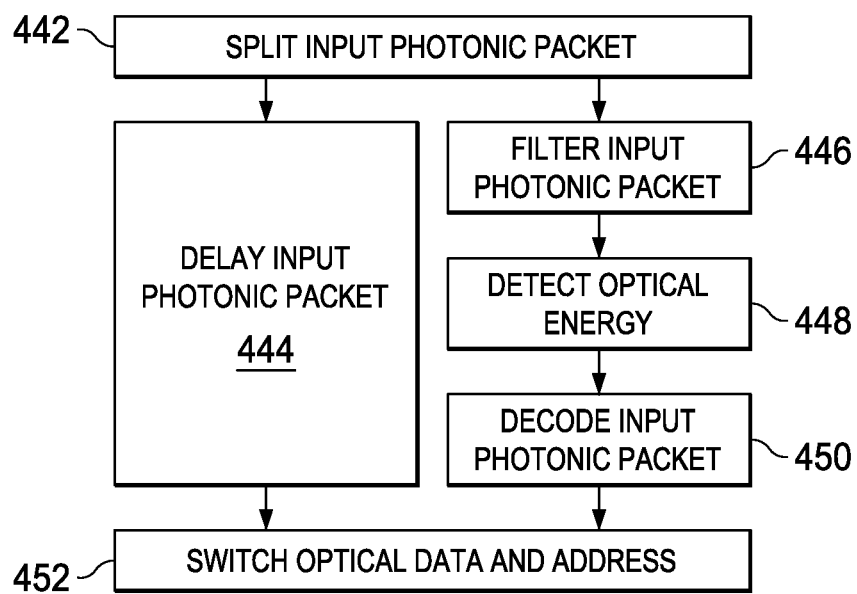

SYSTEM AND METHOD FOR MULTI-WAVELENGTH ENCODING

This application claims the benefit of U.S. Provisional Application Ser. No. 61/735,842 filed on Dec. 11, 2012, and entitled "System and Method for Multi-Wavelength Signaling in a Photonic Packet Switch," which application is hereby incorporated herein by reference.

TECHNICAL FIELD

The present invention relates to a system and method for optical communications, and, in particular, to a system and method for multi-wavelength encoding.

BACKGROUND

Data centers route massive quantities of data. Currently, data centers may have a throughput of about 5-7 terabytes per second, which is expected to drastically increase in the future. Electrical packet switches are used to route data packets in these data centers. Electrical packet switches switch or route packets based on a packet header with inter-stage buffering. The buffering can overflow, causing packet loss and the need for packet retransmission.

Racks of servers, storage, and input-output functions may contain top of rack (TOR) packet switches which combine packet streams from their associated servers and/or other peripherals into a lesser number of very high speed packet streams per TOR switch. These packet streams are routed to the packet switching core switch resource. Also, TOR switches receive the returning switched streams from that resource and distribute them to servers within their rack. There may be 4×40 Gb/s streams from each TOR switch to the core switching resource, and the same number of return streams. There may be one TOR switch per rack, hundreds to ten thousands of racks, and hence hundreds to ten thousands of TOR switches in a data center.

There has been a massive growth in data center capabilities, leading to massive electronic packet switching structures, which are becoming more complex, difficult and expensive to implement. There is a desire for alternative to this approach, such as photonic packet switching.

SUMMARY

An embodiment method for multi-wavelength encoding includes receiving an input packet stream having an address and data and encoding the address of the input packet stream producing an encoded address including a first group of symbols including a first selected symbol, where the first group of symbols has more than two symbols. The method also includes generating a first wavelength in accordance with the first selected symbol and generating an output optical packet stream having the data of the input optical packet and the first wavelength, where the first wavelength corresponds to the first selected symbol. Additionally, the method includes modulating the first wavelength with the input optical packet stream.

An embodiment method for decoding multi-wavelength addresses includes splitting an input optical packet stream having a plurality of wavelengths to a first optical stream and a second optical stream and separating the first optical stream into a first group of optical streams by wavelength, where the first group of optical streams is more than two optical streams. The method also includes detecting optical power in the first group of optical streams producing a plurality of symbols, where optical power is detected in the first optical stream of the first group of optical streams.

An embodiment system for multi-wavelength encoding addresses of an input packet stream includes a packet stream address reader configured to determine the address of an input optical packet of the input packet stream and a first encoder coupled to the packet stream address reader, where the first encoder is configured to encode the address a first including a first group of symbols including a first selected symbol, and where the first group of symbols has more than two symbols. The system also includes a first plurality of switches coupled to the first group of symbols and a first plurality of wavelength sources coupled to the first plurality of switches. Additionally, the system includes a first optical modulator coupled to the first plurality of switches and the input optical packet, where the first plurality of switches is configured to couple a first wavelength source of the first plurality of wavelength sources to the first optical modulator, and where the first wavelength source corresponds to the first selected symbol.

An embodiment system for multi-wavelength decoding addresses of an input optical packet stream includes a splitter configured to split the input optical packet stream into a first optical stream and a second optical stream and a first optical filter configured to separate by wavelength the first optical packet stream to produce a first group of optical streams including more than two optical streams. The system also includes a first plurality of optical detectors coupled to the first optical filter configured to detect power in the first group of optical streams and detect power in the first optical stream of the first group of optical streams. Additionally, the system includes a switch coupled to the first plurality of optical detectors configured to switch the second optical stream with the first group of optical streams.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 2A-B illustrate another embodiment system for multi-wavelength encoding;

FIG. 3 illustrates a table with address space and bit rate per carrier;

FIGS. 4A-B illustrate a table of address field size and the number of candidate wavelengths for m-ary encoding;

FIG. 5 illustrates a table with the number of candidate carriers and the bit rate carriers for m-ary encoding;

FIG. 7 illustrates a table with address values for various encoding method;

FIG. 8 illustrates an additional embodiment system for multi-wavelength encoding;

FIGS. 11A-C illustrate a table with candidate wavelengths, number of wavelengths used, and address field sizes for selecting n of M wavelengths;

FIGS. 14A-B illustrate combinations for selecting 4 of 8 wavelengths;

FIGS. 15A-B illustrate a table with the number of candidate wavelengths, number of wavelengths used, and address fields for selecting n/2 from M/2 wavelengths;

FIGS. 16A-B illustrate a table with the number of candidate wavelengths, number of wavelengths uses, and address field size for selecting n/k from M/k wavelengths;

FIG. 17 illustrates another embodiment system for multi-wavelength encoding;

FIG. 19 illustrates an embodiment method of multi-wavelength encoding; and

FIG. 20 illustrates an embodiment method of multi-wavelength decoding.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Photonic packet switches are a family of network communication elements that can be used as the core switch in a data center, or used in any other packet switching environment. In a photonic packet switch, packets are switched by photonic devices, without converting them to electrical signals. Packet switches switch streams of packets by switching each packet independently towards its destination.

There are several methods of wavelength-based address coding, and various implementations to achieve those codings. The destination address of each packet is encoded by illuminating a combination of wavelengths at the transmitter, with several schemes. In one example, binary coding is used. To encode a symbol, one of two wavelengths is selected. For example, the first wavelength is selected for a "0," and the second wavelength is selected for a "1," or vice versa. The address may be encoded with two wavelengths per symbol.

In another example, an address is encoded as n digits with a base m. One of several wavelengths is selecting. The number of candidate wavelengths is m*n. This leads to the address being expressed in ternary, quaternary or higher level coding of optical carrier wavelength into address. The address space, is $3^n$, $4^n$ or in the general case $m^n$. There is an increased address space for a given total number of selected wavelengths, or a reduction in the number of selected wavelengths for any given address space, thereby increasing the bit-rate per optical carrier. This scheme may increase or decrease the number of candidate wavelengths for a given address space, depending on the exact scenario.

In an additional example, n wavelengths are selected from M candidates, without assigning them to groups. This gives a large address space and/or reduces the number of candidate wavelengths and reduces the number of lit wavelengths. The maximum address space is $M!/((M-n)!*n!)$.

In another example, the address is encoded into k groups of (n/k from M/k wavelengths), which results in [Select n/k from M/k] over $1/k^{th}$ of the address lines, repeated k times. These examples may be combined.

In one embodiment, the selected wavelengths are used only for address signaling, and do not carry the data payload. In another embodiment, the selected wavelengths are used for address signaling, while some or all of the wavelengths also carry the data payload.

Figure 1:
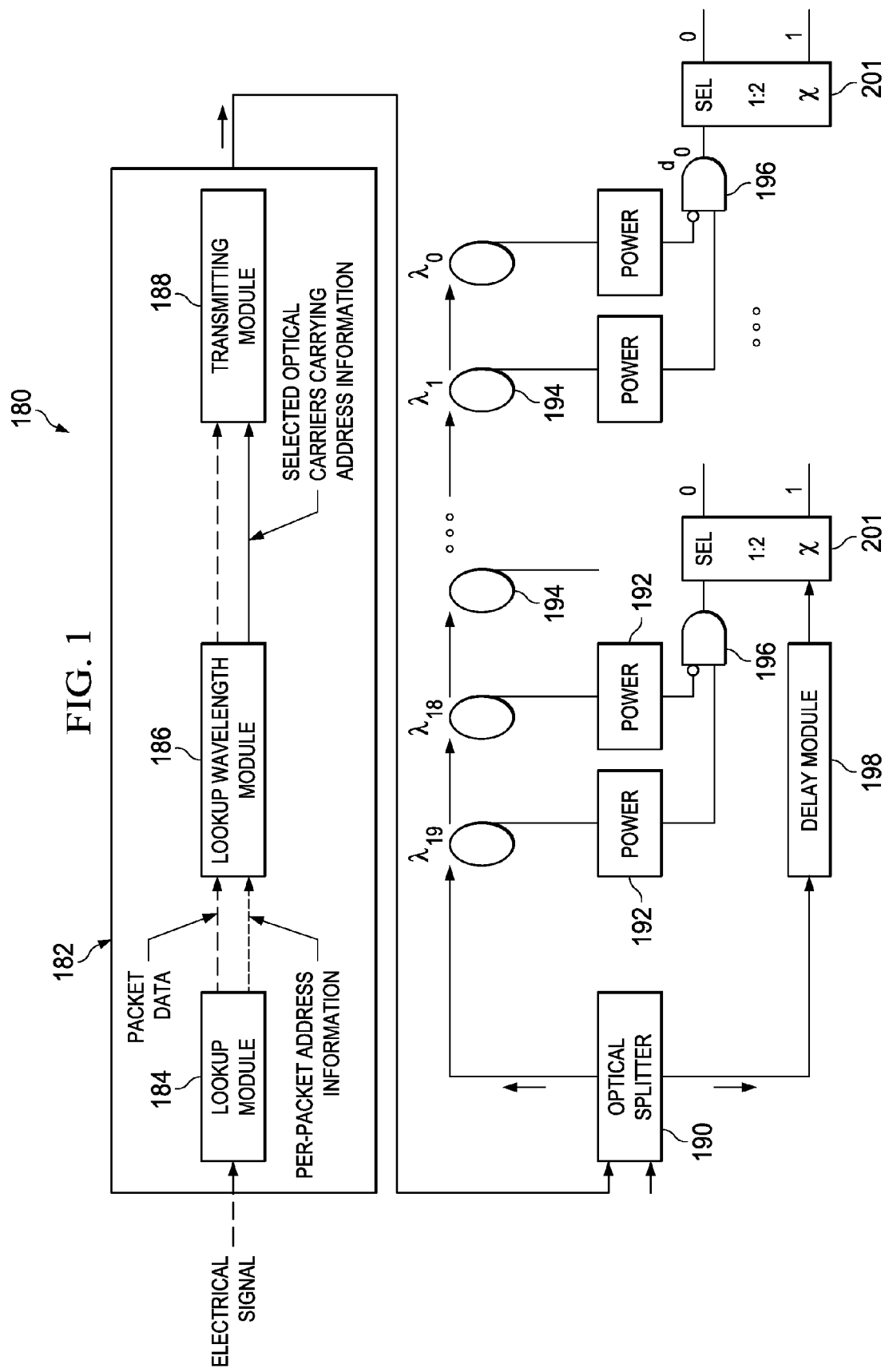
FIG. 1 illustrates an embodiment system for multi-wavelength encoding and decoding.

FIG. 1 illustrates packet address multi-wavelength decoder 180. A packet stream to be sent through a photonic switch initially goes to packet address mapper 182. Lookup wavelength module 184 reads the address of the electrical packet. In an example, the packet address is read from a packet header. Alternatively, the packet address is read from a wrapper or generated by a wrapper.

The packet stream data and the packet address information are then passed to lookup wavelength module 184. Lookup wavelength module 184 is a packet address and wavelength value mapper, which sets the wavelengths to encode the packet address for the corresponding packet. The wavelengths are different for each packet, based on its address. In one example, the symbols in the address are mapped to one of two wavelength values, depending on whether that bit is a "0" or a "1." One of the wavelengths is selected if the bit is a "0" and the other wavelength is selected if the bit is a "1." Therefore, for a ten bit address, ten separate operations occur, each selecting one of two wavelength values based on the value of the bit. Hence, for a ten bit address, there are twenty wavelengths selected from.

The selected wavelengths are fed, along with the packet, to transmitting module 188. Transmitting module 188 contains a bank of modulators. In an example, the packet is inverse multiplexed, resulting in an inverse multiplexed stream for each selected wavelength. In another example, the packet stream bypasses the inverse multiplexing function, with the full bandwidth stream fed into a single electro-optic modulator, creating an optical copy of the packet for each stream.

The packet stream is then split by optical splitter 190 into two streams. One packet stream is fed to optical filters 194, which may be ring resonators. Optical filters 194 separate the optical carriers according to wavelength. These individual optical carriers are fed to optical receivers 192, which measure the presence or absence of optical power at the filtered frequency. The outputs of optical receiver 192 are fed in pairs to logical gates 196, which provides a "1" for power detected on a first input and no power detected on a second input, or a "0" for no power detected on the first input and power detected on the second input. The pair of wavelengths going into one of logical gates 196 is a pair of wavelengths that encode an address bit.

Delay module 198 delays the other packet stream. Optical switches 201 route this optical packet stream to one of the two output ports based on the output from logical gates 196. The output of the first of optical switches 201 connected to inputs on one of two next stage switches, where the process continues in stages. Optical switches 201 as illustrated are 1:2 switches, but larger switches may be used.

Additional packet address decoders are disclosed by the U.S. Provisional Patent Application Ser. No. 61/591,628 entitled "Spectral Encoding of an Optical Label or Destination" filed on Jan. 27, 2012, U.S. patent application Ser. No. 13/648,593 entitled "Optical Switching Device Using Spectral Trigger" filed on Oct. 10, 2012, and U.S. Provisional Patent Application Ser. No. 61/591,441 entitled "Spectral Encoding of an Optical Label or Destination," filed on Oct. 10, 2012, which applications are hereby incorporated herein by reference.

FIGS. 2A-B illustrate packet address reader 186. Packet address reader 186 shows a four symbol address field, but fewer or many more address symbols may be used. The input packet stream is fed into packet address reader 316, which extracts the input address. The address has n symbols, where n=4 is pictured. The address is extracted as n parallel symbols, with the symbols going to parallel structures 200.

Parallel structures 200 include logical buffer gate 206 in parallel with logical inverter 208. Logical buffer gate 206 and logical inverter 208 drive optical switches 204 based on the symbol value. In an example, optical switches 204 are small on/off optical switches. Optical switches 204 open a connection to one of wavelength optical sources 202. One of a pair of wavelength optical sources 202 is connected to optical modulator 322 based on the symbol value.

In an example, inverse multiplexing is used. There are n optical modulators 322 in parallel. The packet stream is fed to inverse multiplexer 320, which may be a packet edge synchronized inverse multiplexer. Inverse multiplexer 320 converts the packets in the packet stream to packet fragments in n lower speed data streams at a rate of 1/n of the input to the inverse multiplexer for the n output lines, which are fed to n optical modulators 322. These n data streams are fed to the n optical modulators 322 to create n different optical carriers. These n optical carriers in combination contain both the routing information and the wavelength, and the packet data.

In another example, inverse multiplexing is not used. There is one optical modulator 323. The selected optical carriers may be combined optically into a multi-carrier optical signal which is modulated with the packet data at the full data rate in optical modulator 323, which is a broadband optical modulator. Optical modulator 323 modulates the set of optical signals at the original data rate. FIG. 3 illustrates table 260, which shows a relationship between the number of symbols n, the number of wavelengths used 2n the address space, and the bit rate per carrier as a percentage of the input bit rate. The address space has $2^n$ address location for n optical carriers selected from 2n candidate carriers. For example, for 10 optical carriers selected from 20 optical carriers, there are 1024 addresses, and the bit rate per carrier is 10.00% of the input bit rate. For address fields in the thousands, there are a large number of active optical carriers per packet stream and a large number of packet streams, resulting in a very low data rate per data stream. Also, there are large numbers of sources, modulators, and detectors per stream.

In m-ary coding, wavelengths may each be selected from one of more than two candidate wavelengths. Selecting a given number of active wavelengths from more candidate wavelengths increases the address space. For a given required address space, the number of active optical carriers can be reduced, thereby increasing the bit rate per optical carrier. FIGS. 4A-B illustrate table 240, which shows the relationship between the number of wavelengths selected, the base used, the address field size, and the number of candidate optical wavelengths for m-ary coding. For a coding stream using base m, where m equals 2 in the previous example, for n parallel optical wavelengths, the address space is $m^n$, and the number of candidate optical carriers is m*n. For the case of m=2 and n=10, there is an address space of $2^n$=1024 addresses using 2n=20 candidate optical carriers. However, by inserting a binary to m-ary coder and decoder into the addressing path before modulation and after reception, respectively, the relationship between address field size and the number of wavelengths is changed, such that, for m=3 and n=10, the address space increases to $3^{10}$=59,049, and the number of optical carriers increases to 3n=30 candidate optical carriers. For m=4, n=10, the address space further increases to $4^{10}$=1,048,576, while the number of candidate optical carriers increases to 4n=40 optical carriers. Thus, increasing m while holding n constant increases the address space. In addition, increasing m reduces n while maintaining at least the same number of addresses. For example, m=3 and n=7 gives 2187 addresses, using 21 candidate wavelengths, and n is reduced by 30%. For m=4 and n=5 there are 1024 addresses, while the number of active optical carriers is halved. With a base-8 (octal) coding level, just 3 active wavelengths can support up to 4,096 addresses, while 10 wavelengths support an address field of over 1 billion addresses with 80 candidate wavelengths. 80 candidate wavelengths is within the upper bound of the number of optical carriers that are viable, and corresponds to a standard dense wavelength division multiplexing (DWDM) with an optical carrier spacing of 50 GHz. Due to the availability of binary logic coding, bases 4 and 8 may be convenient to implement.

As an example, for an address field of 5,000 the values of m, n shown in FIG. 5 would suffice. FIG. 5 illustrates table 220 showing the lowest number of required active wavelengths for various forms of base m ranging from 2 (no coding), and 3, to 8 (with transcoding to a different numeric base), with the base ranging from 2 to 20. Binary coding requires 13 active wavelengths to achieve an address field of at least 5,000 (13 wavelengths of m=2→8,192, but 12 wavelengths would have given 4,096 which is under 5,000). However examining an example where transcoding to another numeric base has been applied, octal coding (base 8) has an address field 32,768, well in excess of 5,000, with just 5 active optical carriers. The use of 4 optical carriers with octal coding would have achieved only 4,096 addresses, which is close to but short of the example goal of 5,000. At a base of 20, the gain is even more significant, with the address field being achieved with just 3 active optical carriers, which provides an address space of 8,000, well in excess of the required example 5,000. However, as is shown in FIG. 5, as m increases for a given address space (in this case at least 5,000) besides the decrease in the number of illuminated wavelengths, there is an increase in the number of candidate wavelengths. In fact, this is not a problem, since the number of candidate wavelengths can be made arbitrarily large by the choice of wavelength spacing with current commercially available DWDM transmission operating with a 50 GHz optical grid providing at least 80-100 candidate optical carriers in one waveband. Also, tunable devices and optical filters/multiplexers are readily available to operate at this channel spacing. Additionally, tighter wavelength grids down to 12.5 GHz have been shown to be implementable, which would yield up to 320 optical candidate wavelengths in a single optical band. As m increases due to the application of transcoding, the number of active wavelengths falls, and hence the bit rate per wavelength increases. In FIG. 5, this is illustrated by a baseline (no transcoder) bit rate reduction to $\frac{1}{13}^{th}$ of the original bit rate (0.077× original bit rate). However, with a coding base of 20, the bit rate is 33% of the original bit rate, or 429% of the performance of the prior base system.

Figure 6:
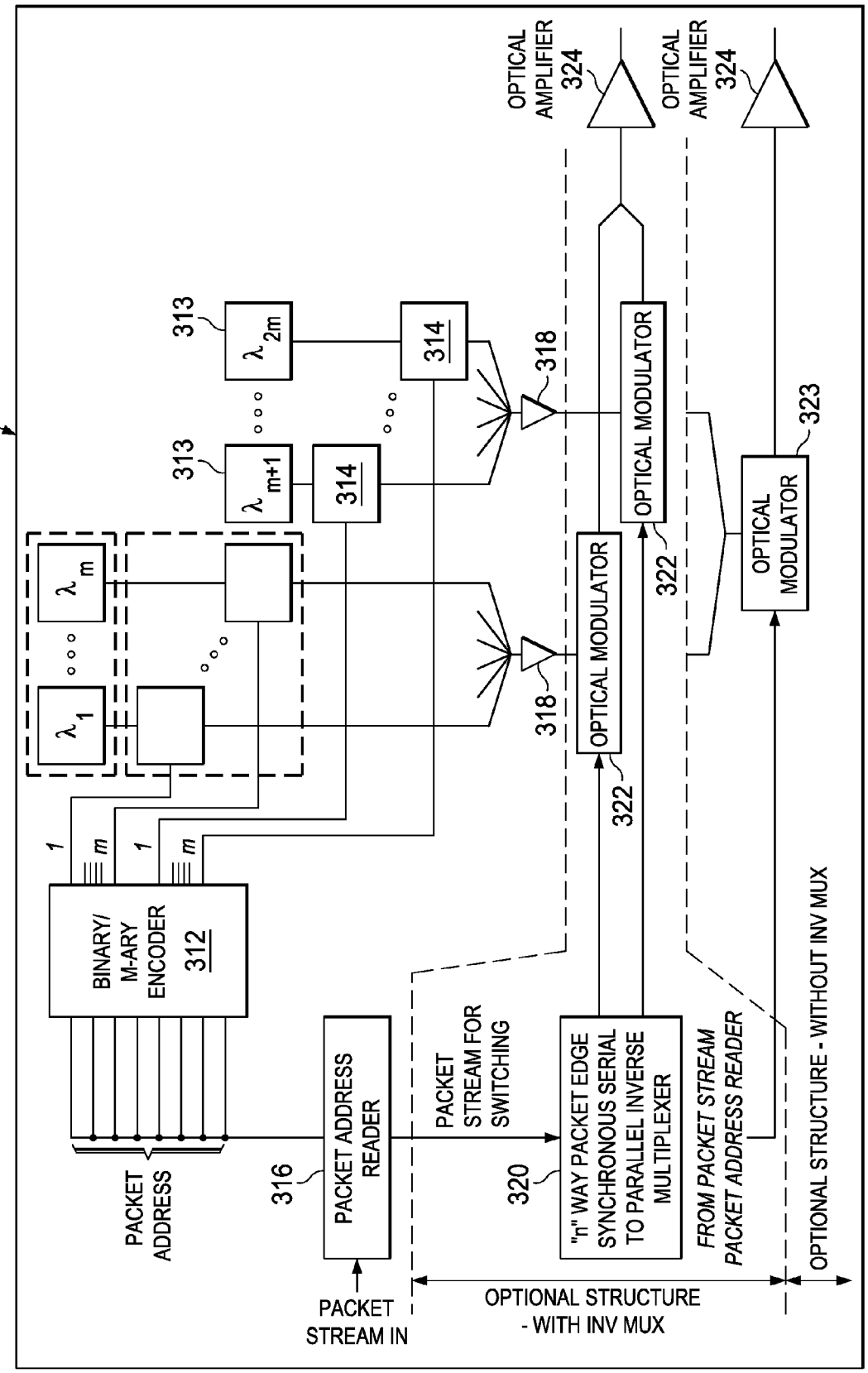
FIG. 6 illustrates an additional embodiment system for multi-wavelength encoding.

FIG. 6 illustrates multi-wavelength modulator 310, which may be used to generate an optical packet stream on one or more wavelength carriers, each selected from m optical carriers, where m>2 (i.e. binary/m-ary transcoding has been applied). The wavelengths of the carriers carry the routing address in an m-ary coding scheme, where m is an integer. The input packet stream is fed to packet address reader 316. There may be inverse multiplexing. When inverse multiplexing is used, the packet stream is fed to inverse multiplexer 320, a packet edge-synchronous inverse multiplexer, which spreads the packet stream over n optical carriers having a data rate of 1/n. Then, the n outputs of inverse multiplexer 320 are fed to n optical modulators 322. In an example without inverse multiplexing, the optical carriers are modulated with the same full bandwidth data by optical modulator 323. The use of inverse multiplexing lowers the bit rate per carrier, which improves the optical link budget across the switch, and makes individual use of each optical carrier to carry a different part of the data stream. On the other hand, not using inverse multiplexing is simpler, but leads to replicated optical data streams which will occupy more bandwidth, and which may compromise the optical channel spacing, since the optical sidebands of one stream should not overlap the optical carrier wavelength of an adjacent channel.

With or without inverse multiplexing, the entire optical packet stream bandwidth is carried on one fiber and fed through one switch as a multi-wavelength signal. The output is amplified by optical amplifier 324. The far end optical conversion, not pictured, involves optically demultiplexing the carriers and sending the carriers into separate optical receivers. With inverse multiplexing, an array of n receivers may feed an inverse-inverse multiplexer to reinstate the original packet stream. Without inverse multiplexing, the receivers generate a version of the entire packet stream at full bandwidth. If the link budget across the switch is marginal for the high speed signal, each of the replicated copies may have a high error rate. The high error rate may be drastically reduced by applying combinational techniques, such as majority decision making.

The packet address enters encoder 312, which maps the binary addresses of the packets to another numerical base. FIG. 7 illustrates table 250, which shows examples of binary to m-ary mappings that may be used by encoder 312. There are several groups of outputs from encoder 312, where each group has m lines, and only one line per group is activated at a time. The activated line within each group signifies the value of that group's m-ary symbol. The number of groups is equal to the number of m-ary symbols in the address field.

These active lines activate optical switches 314, which are small fast optical on/off switches, such as integrated Mach-Zehnder switches. These switches have to be fast to set up the optical carrier during the inter-packet gap between the packets of the packet stream, which is about 1 ns for a 100 Gb/s stream or 2.5 ns for a 40 Gb/s stream. Optical switches 314 are coupled to wavelength generators 313. Thus, optical switches 314 couple the selected source, and hence the selected wavelength, encoding one m-ary symbol into an optical carrier. One optical switch and one wavelength generator per group is activated. Therefore, n optical carriers carry the packet data plus packet address information in an address field of $m^n$. For an n symbol m-ary address, the total number of candidate optical carriers is m*n.

The selected wavelengths are then amplified by optical amplifiers 318, for example to offset the loss from optical combiners. With inverse multiplexing, the selected wavelengths are fed to optical modulators 322. The outputs of optical modulators 322 are then combined to produce a multi-carrier optical signal with n optical carriers containing inverse multiplexed packet data at 1/n of the original data rate and an address field of $m^n$. Without inverse multiplexing, the selected wavelengths are fed to optical modulator 323.

By manipulation of m, an arbitrarily large address field may be created by a given value of n. Alternatively, for a given size address field, the bit rate reduction per optical carrier may be varied by the choice of m and n.

An embodiment of the m-ary coding approach and its implementation is for the case of m=$2^k$ where k is an integer. FIG. 8 illustrates multi-wavelength modulator 330, which is similar to multi-wavelength modulator 310. Wavelength modulator 330 requires m=$2^k$, where k is an integer greater than 1. For example, wavelength modulator 330 may be used for quaternary, octal, or hexadecimal coding. Binary to $2^k$-ary coding may be performed by encoders 332. Encoders 332 may be implemented by parallel smaller simpler coders than encoder 312, because the mapping of specific groups of binary symbols into each $2^k$-ary symbol is independent of the values of other $2^k$-ary symbols.

The outputs of encoders 332 are fed to optical switches 314. The output of an encoder is fed to a group of optical switches. Optical switches 314 select one wavelength generator 313 to be connected in each group. The output may be amplified by optical amplifier 318, and then fed to optical modulators 322 or optical modulator 323.

As in multi-wavelength modulator 310, the input packet stream is fed to packet address reader 316, which packet addresses to encoders 332. When inverse multiplexing is used, the packet stream is fed to inverse multiplexer 320, and the outputs are fed to optical modulators 322. However, when inverse multiplexing is not used, the packet stream is fed to optical modulator 323. The output of optical modulator 323 or optical modulators 322 are fed to optical amplifier 324.

The output of multi-wavelength modulator 310 or multi-wavelength modulator 330 is fed to a photonic switching fabric, where it undergoes packet level photonic switching. The routing through the photonic switching fabric is determined by the packet address carried by the selected wavelengths.

Figure 9:
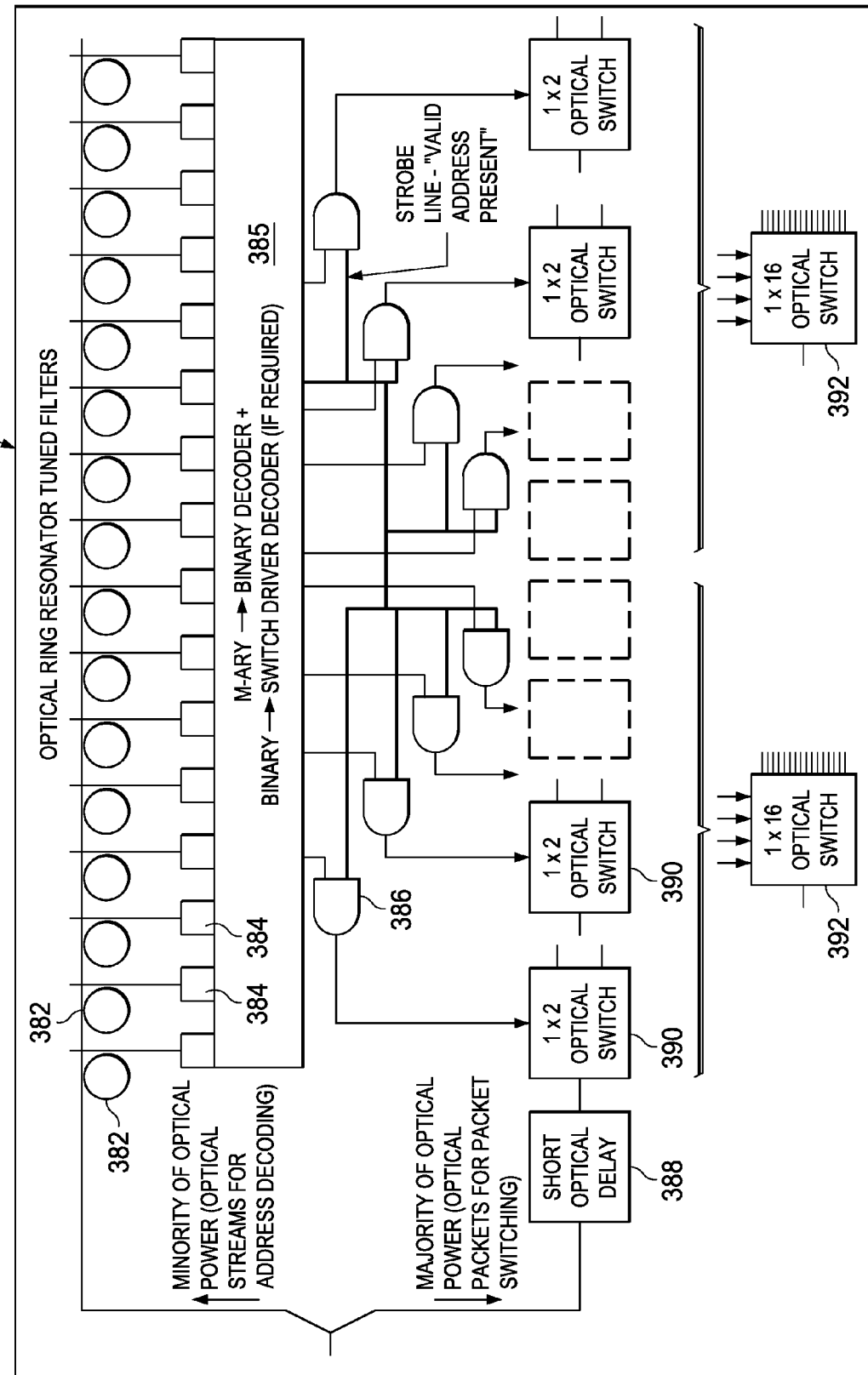
FIG. 9 illustrates an embodiment system for multi-wavelength decoding.

The multi-wavelength encoded address may be decoded by a decoder, for example multi-wavelength decoder 380, illustrated in FIG. 9. The incoming optical power is split. Some optical power is sent to filters 382. Then, filters 382 filter out one of the candidate wavelengths. In an example, filters 382 may be optical ring resonator tuned filters. In another example, filters 382 are arrayed waveguide grating (AWG) wavelength division multiplexing (WDM) multiplexers. The filtered wavelengths are sent to optical receivers 384, which detect optical power at the filtered wavelengths. Thus, the address is recovered.

Gates 386 receive a strobe line and word line to determining if a valid address is present. The decoded binary symbols are fed to the multi-stage switch, and set up the crosspoints to enable the connection through the switch. To turn a 1×2$^n$ score switch into a 2$^n$×2$^n$ multiport switch additional decoded signaling routing from multiple input ports is needed.

The balance of the optical power from the splitter is passed to optical delay 388, a short optical delay. Optical delay 388 allows time for address decoding. In an example, the delay is tens of nanoseconds. The delayed packets are passed to optical switches 390. As pictured, optical switches 390 are 1×2 switch stages. Alternatively, more complex switches, such as 1×16 optical switches 392 may be used.

Optical receivers 384 pass the address words to decoder 385. For a chain of 1×2 switching stages, as pictured, decoder 385 is an m-ary to binary decoder. The first switching stage is driven by the most significant bit of the binary address, while the last stage is driven by the least significant bit. Alternatively, decoder 385 decodes to another form. As an example, the decoder could provide a quaternary output or a paired binary bits output for use with a 1:4 switching stage. In an embodiment, where the switch stage sizing matches the coding base, for example when the coding base is 6 and 1×6 switches are used, the switch stage may be driven directly from the optical receivers without decoder 385. Decoder 385 may be implemented by a dedicated logic function. Alternatively, decoder 385 may be created by the use of a read-only memory (ROM) which is encoded to act as a lookup table.

Figure 10:
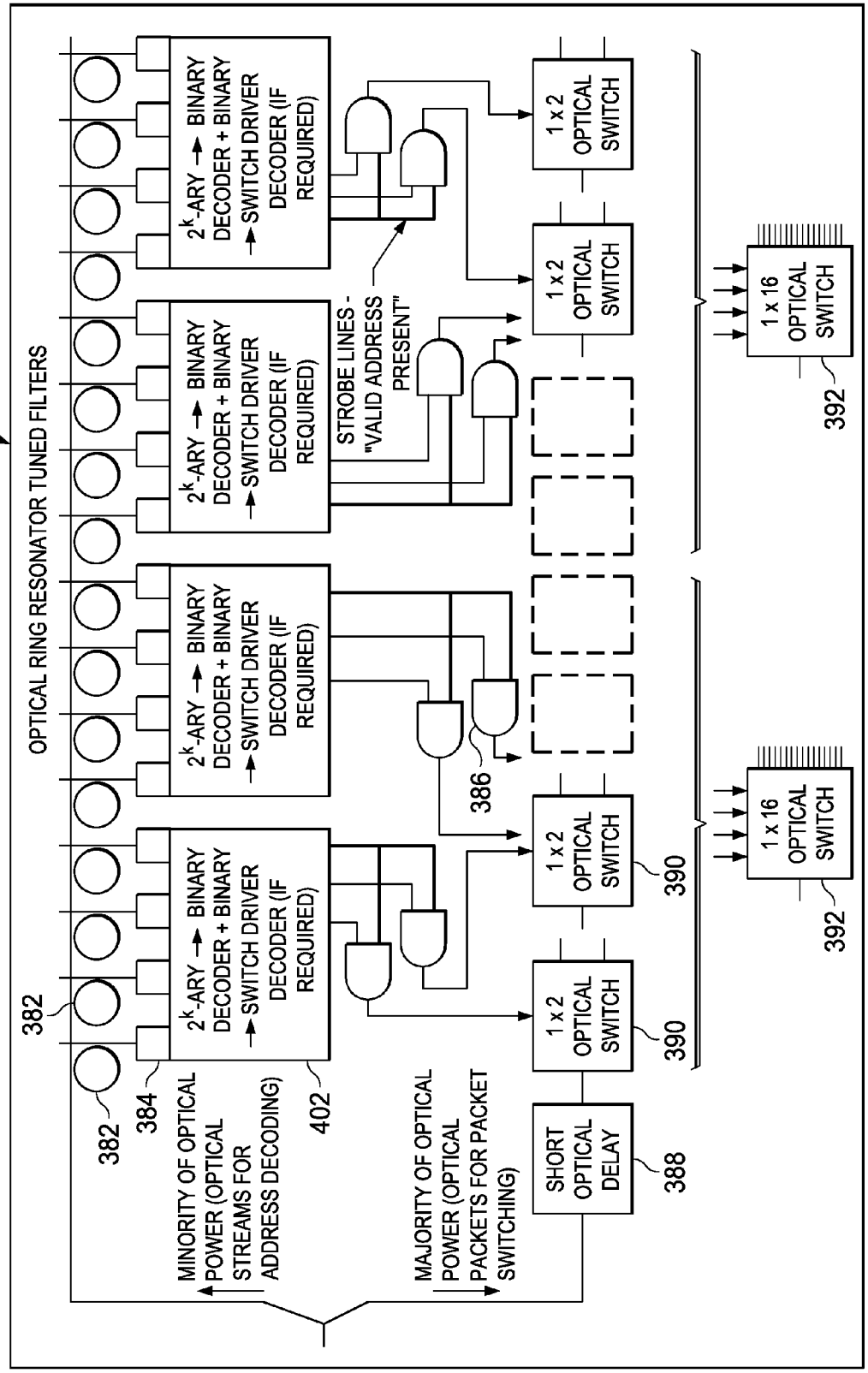
FIG. 10 illustrates an additional embodiment system for multi-wavelength decoding.

FIG. 10 illustrates multi-wavelength decoder 400, which is similar to multi-wavelength decoder 380. Multi-wavelength decoder 400 is used when m=2$^k$, where k is an integer greater than 1. In an example, multi-wavelength decoder 400 is used to decode an address that was encoded using encoder 332. As in multi-wavelength decoder 380, the input optical power is split, with a portion going to filters 382, then to optical receivers 384. The output of optical receivers 384 is sent to decoders 402. Decoders 402 are 2$^k$-ary to binary decoders. Also, decoders 402 may optionally contain a binary to switch driver decoder. The output of decoders 402 are checked with gates 386 using strobe lines to determine the validity of the address.

The remaining portion of the optical power is fed to optical delay 388, then to optical switches 390 or optical switches 392. Optical switches 390 or optical switches 392 switch the data signal from optical delay 388 using the addresses from decoder 402.

In another example, instead of selecting n of m candidate wavelengths in a group, more than one wavelength may be selected from a field of M candidate wavelengths. For M candidate wavelengths, there are M ways to select the first wavelength, M−1 ways to select the second wavelength, and (M−(n−1)) ways to select the nth wavelength. When the order of selecting is not important, there are M!/n! combinations. When the order of selection is not important, as in selecting wavelengths, the number of combinations is given by:

$$\frac{M!}{n!(M-n)!}.$$

For n=10 and M=20, the number of addresses in the address field is 184,756. Further, for 20 candidate wavelengths and using n=3, there are 1,140 addresses in the address field. Hence, a slightly larger address field than the original solution provided may be created with only three active carrier wavelengths instead of 10.

FIGS. 11A-C illustrate table 230, showing the address field size for the number of candidate wavelengths and the number of wavelengths selected. Very large address spaces are achievable with low numbers of selected wavelengths for 20 or more candidate wavelengths. For 40 candidate wavelengths, nearly 100,000 addresses are available for n=4. A large data center may be fabricated with as few as three or four selected wavelengths, resulting in the inverse multiplexing of 100 Gb/s signals down to 33.33 Gb/s or 25 Gb/s per wavelength. In this context, some instantiations of 100 Gb/s data streams use 4×25 Gb/s sub-streams, so these could be applied to the appropriate wavelength optical carriers, with the advantages of inverse multiplexing (each stream carrying separate components of information without replication) without further inverse multiplexing. A connectivity signaling scheme using 4 wavelengths selected from 20 wavelengths would have an address field size of 4,845 addresses, while a signaling scheme using 4 wavelengths from 40 would have an address field size of 91,390 addresses (likely to be larger than the largest existing or planned data center's complement of TOR's. However, a connectivity scheme using 4 wavelengths selected from 60 wavelengths would have an address field size of 487,635 addresses. The use of 40 candidate wavelengths or more can create enough addresses for the planetary internet. For example, 10 active wavelengths selected from 60 candidate wavelengths gives an address field size of 75.3 billion addresses.

Figure 12:
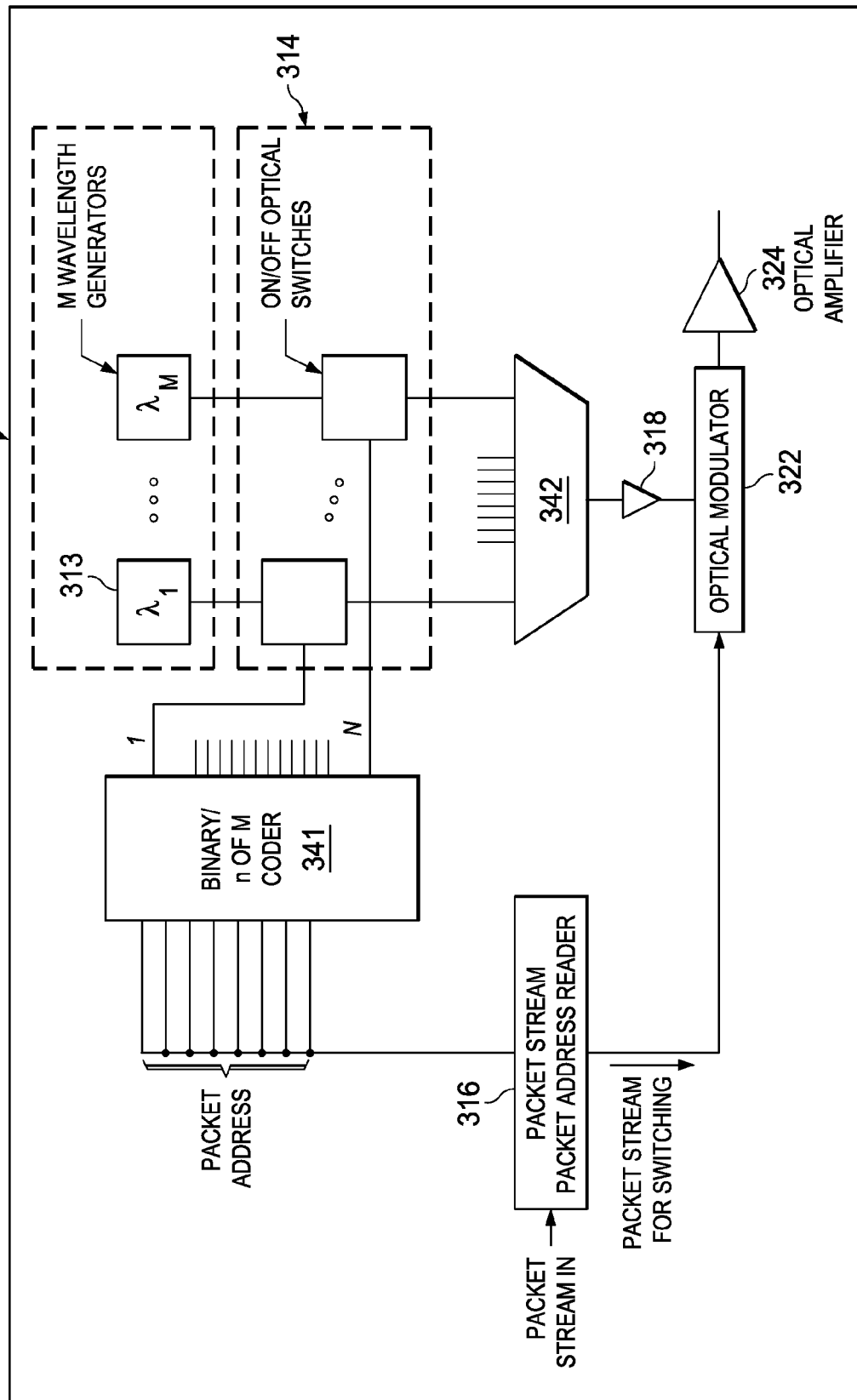
FIG. 12 illustrates an additional embodiment system for multi-wavelength encoding.

FIG. 12 illustrates multi-wavelength encoder 340 for selecting n from M candidate wavelengths. In multi-wavelength encoder 340, an optically formatted multicarrier packet stream is generated, where each selected wavelength has a replica of the entire data stream. The packet stream to be optically switched enters and goes to packet address reader 316. The packet address is then sent to encoder 341, a binary to n of M encoder. Encoder 341 encodes the incoming binary address into a format where exactly n optical carrier wavelengths are selected from a candidate field of M wavelengths. Encoder 341 may be logic based. Alternatively, encoder 341 may use a look up table, for example stored in ROM.

Encoder 341 activates a specific n of its M output lines, causing a corresponding n of M associated optical switches 314 to be activated. Optical switches 314 then connect a specific n of M wavelength generators 313 optical combiner 342. For example, optical combiner 342 is a wavelength division multiplexing (WDM) multiplexer. The address then passes through optical amplifier 318 to offset the loss on the optical combiner, then to optical modulator 322. The composite group of n optical carriers transmits the packet address information, encoded by the selection of the wavelengths of each of its n constituent carriers. Optical modulator 322 modulates the packet stream from packet address reader 316 and the selected n wavelengths. A multi-carrier optical signal carrying the packet data and the packet routing is output from multi-wavelength encoder 340. While FIG. 12 does not show inverse multiplexing, n-way inverse multiplexing similar to that of FIG. 8 could be added.

Figure 13:
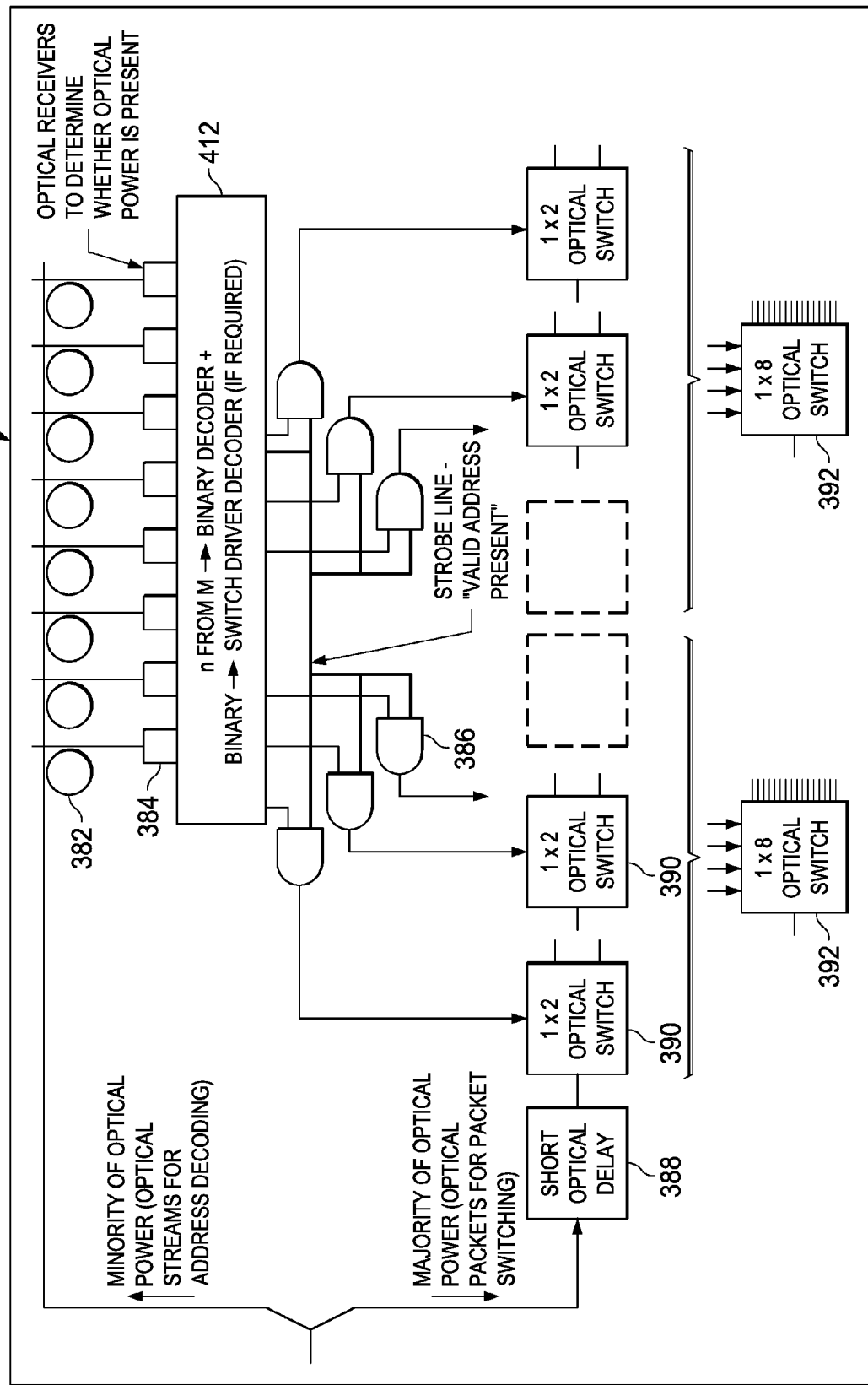
FIG. 13 illustrates an additional embodiment system for multi-wavelength decoding.

FIG. 13 illustrates multi-wavelength decoder 410 for extraction and processing of the optical wavelength based addresses of the packet stream at the packet switch for n selected wavelengths from M candidate wavelengths. Multi-wavelength decoder 410 may be used to decode an address that was encoded using encoder 341. Multi-wavelength decoder 410 is similar to multi-wavelength decoder 380. The address field at the input of multi-wavelength decoder 410 is not treated as m-ary symbols, but as a specific form of code operating across all wavelengths to provide a selection of n values from M possibilities.

The input optical signal is split, with a portion of the power going to filters 382, which may be optical ring resonator tuned filters, as pictured. Alternatively, filters 382 may be an AWG WDM demultiplexer. The filtered wavelengths go to optical receivers 384, which determine whether optical power is present at the filtered wavelengths, and then to decoder 412. Decoder 412 is an n from M to binary decoder. Optionally, decoder 412 also includes a binary to switch driver decoder. The outputs wavelengths are tested by gates 386 and strobe lines to determine if a valid address is present.

The other portion of the input optical packet is sent through optical delay 388 to optical switches 390 or optical switches 392, where it is switched with the address from decoder 412.

FIGS. 14A-B illustrate chart 414, which shows an instantiation of n from M coding. In this case, n=4, M=8. Hence, the table shows the combinations for selecting any 4 wavelengths of 8 wavelength candidates. The number of unique combinations is 70 given by $M!/(n!*(M-n)!)=8!/(4!*4!)$.

The n from M code, where there are always n active carriers generated from a field of M, can be generated by a look up table, or logically or by a combination of a look up table and logic. However for large values of n, the encoding may be complex. The complexity may be reduced by dividing the candidate wavelengths into two groups of n/2. In each group, n/2 wavelengths are selected from M/2 candidate wavelengths. However this does somewhat reduce the address space. With n=10 and M=40, there are 848 million addresses. By treating the 10 selected wavelengths as two groups of 5 wavelengths selected out of 20 candidate wavelengths per group and using two 5 out of 20 encoders and decoders, about 240 million addresses are achieved. Alternatively, for selecting 4 wavelengths out of 40 candidate wavelengths, there are 91,360 address locations. By sub-dividing that into two 2 out of 20 encoders and decoders, there are still 36,100 address locations available.

FIGS. 15A-B illustrate table 90 showing the relationship between the number of candidate wavelengths, the number of selected wavelengths, and the address field size for selecting n/2 from M/2 addresses and from combining two n/2 from M/2 multi-wavelength encoders. This combination requires two n/2 from M/2 decoders instead of one n from M decoder. This coding is not as efficient as the single selecting n wavelengths from M candidate wavelengths method, but it enables the use of simpler coders and decoders. Using two 2 from 30 encoders and decoders, instead of one 4 from 60 encoder and decoder the look up tables used have 870 entries, not around 488,000 entries. This results in an address field size of 189,225, reduced from 487,635. For the example of n=10, M=40 using two 5 from 20 coders instead of one 10 from 40 coder results in two look up tables of 15,504 entries each, each as opposed to a single look up table of 848 million entries.

In another example, more than two sub-blocks may be combined. More generally, encoding may be for sets of n/k from M/k encoders and decoders. FIGS. 16A-B illustrates table 100 showing the number of candidate wavelengths, the number of wavelengths selected, and the address field size for 2, 3, and 4 sets of n/k from M/k encoders and decoders. FIG. 17 illustrates multi-wavelength encoder 210 with nested encoders. Initially, the packet stream is received, and packet address reader 316 reads the packet address. The packet address is sent to encoder 212 and encoder 214. Encoder 212 and encoder 214 are binary n/2 from M/2 encoders, which may be implemented by a look up table or by logic. Two encoders are pictured, but more encoders may be used. For example, there may be k n/k from M/k encoders. The encoders may have the same values for n and M, or they may have different values.

The addresses are fed to optical switches 314, which are coupled to wavelength generators 313. Optical switches 314 connect the selected wavelength generators to optical combiner 342, which may be a WDM multiplexer. These addresses are modulated with the input packet stream from packet address reader 316 in optical modulator 322, creating an optical packet stream that contains the data and the address.

Figure 18:
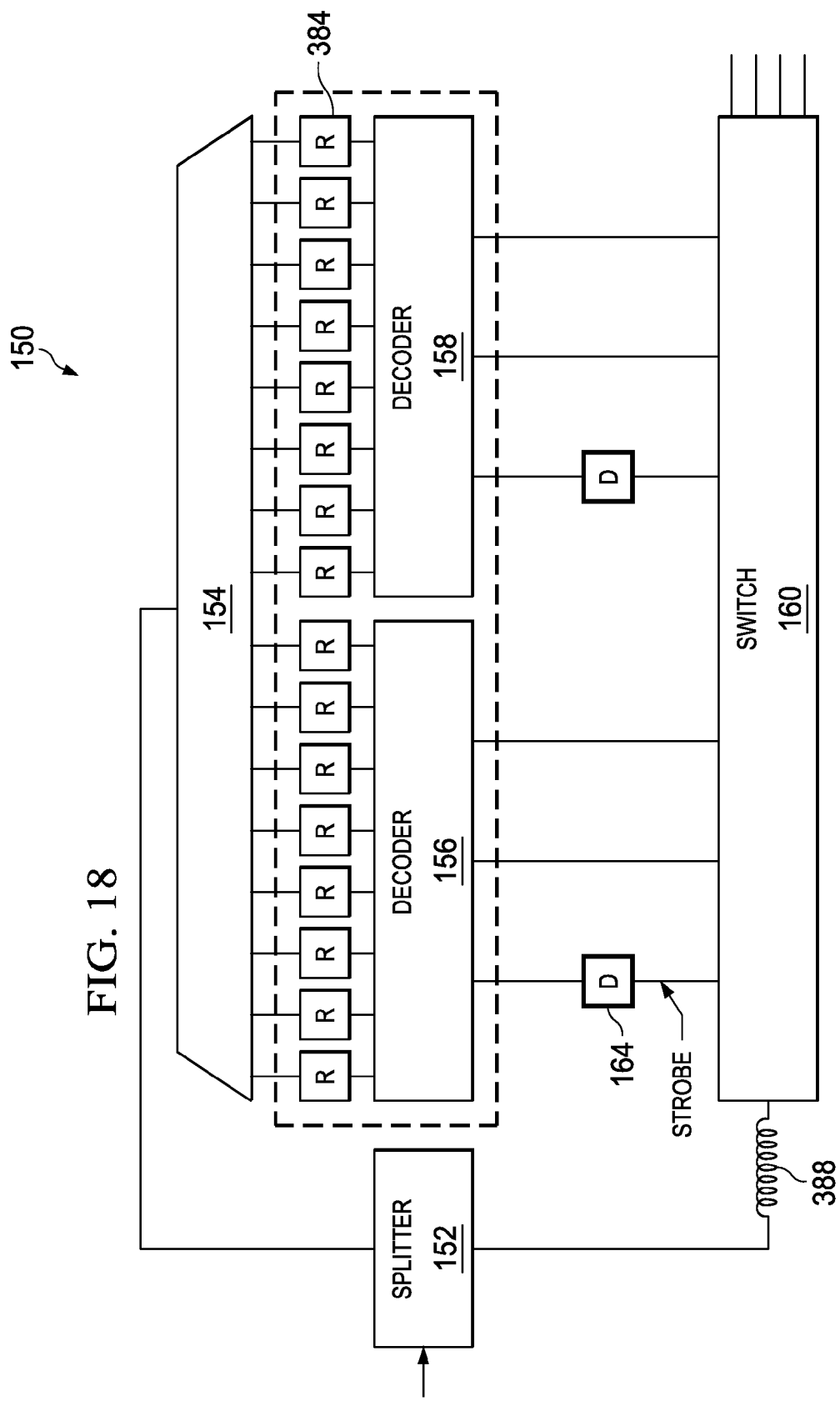
FIG. 18 illustrates another embodiment system for multi-wavelength decoding.

FIG. 18 illustrates multi-wavelength decoder 150, for selecting n/k from M/k wavelengths k times. Initially, splitter 152 splits the input optical data stream. A portion of the optical power goes to filter 154, which may be an AWG WDM demultiplexer. Alternatively, optical ring resonators may be used as filter 154. The outputs from filter 154 go to optical receivers 384, which detect the optical power at the filtered wavelengths. The outputs of optical receivers 384 go to decoder 156 and decoder 158. Two decoders are pictured, but more decoders, or nested decoders, may be used. The decoders may each be the same decoders, as pictured. Alternatively, the decoders may be different. For example, there may be k n/k of M/k decoders. The outputs of decoder 156 and decoder 158 go to switch 160, possibly being checked in module 164 against a strobe to determine validity.

The other portion of the optical power goes to optical delay 388, then to switch 160. Switch 160 may be a single switch, or a sequence of switches. Switch 160 modulates the selected wavelengths with the data.

FIG. 19 illustrates flowchart 420 for a method of multi-wavelength encoding an optical address in an optical data stream. Initially, in step 422, the data packet address is read. This may be determined by a header, by a wrapper, or may be generated by a wrapper.

Then, optionally, in step 424, the input photonic packet is inverse multiplexed. For example, if an address is encoded with n symbols, n inverse multiplexed streams, each with a data rate of 1/n, are produced by inverse multiplexing.

Meanwhile, in step 428, the address is encoded. In one example, the address is encoded using m-ary coding, where 1 of m wavelengths are selected for each of n groups. Alternatively, any n wavelengths of M candidate wavelengths are selected. In another example, k sets of n/k wavelengths of M/k candidate wavelengths are selected. An encoder converts a binary form of the address to the desired form. The encoded address then couples the appropriate wavelength generator to one or more optical modulator. The wavelength coding is generating. For example, this may be performed by connecting wavelength optical sources using optical switches based on the coding. A selection of m of n wavelength optical sources may be selected. Alternatively, n of M wavelength optical sources may be connected.

Finally, the optical stream containing the optical data modulates the generated wavelengths in step 432. The output may be amplified. The output signal contains the data and the address encoded in the wavelengths.

FIG. 20 illustrates flowchart 440 for multi-wavelength decoding. For example, the method shown in flowchart 440 may be used to decode multi-wavelength addresses that were encoded using the method shown by flowchart 420.

Initially, in step 442, an input photonic packet is split. The main portion of the wavelength goes to step 444, where it is optically delayed, for example by tens of nanoseconds. The delay provides for time for the address to be decoded.

The other portion of the optical signal is filtered in step 446 by a series of filters, where there is one filter for each wavelength. The filtering may be performed by optical ring resonator tuned filters or an AWG WDM demultiplexer. Then, in step 448, the output optical energy filtered by the wavelengths is detected to determine if there is optical power for each wavelength.

Next, in step 450, the detected optical energy may be optionally decoded. Finally, in step 452, the optical data is switched with the optical addresses, producing the decoded signal.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for multi-wavelength encoding, the method comprising:
    receiving an input packet stream having an address and data;
    generating a first optical stream and a second optical stream in accordance with the input packet stream comprising inverse multiplexing the input packet stream;
    encoding the address of the input packet stream producing an encoded address comprising a first group of symbols including a first selected symbol and a second selected symbol, wherein the first group of symbols has more than two symbols;
    generating a first wavelength in accordance with the first selected symbol;
    generating an output optical packet stream having the data of the input packet stream and the first wavelength, wherein the first wavelength corresponds to the first selected symbol;
    generating a second wavelength corresponding to the second selected symbol;
    modulating the first wavelength with the first optical stream; and
    modulating the second wavelength with the second optical stream.

2. The method of claim 1, wherein the encoded address comprises n groups of symbols including n selected symbols, wherein the method further comprises:
    generating n wavelengths corresponding to the n selected symbols comprising generating a first optical stream to produce n generated wavelengths; and
    modulating the n generated wavelengths with the input packet stream.

3. The method of claim 1, wherein the first group of symbols includes a third selected symbol, and wherein the method further comprises:
    generating a third optical stream in accordance with the input packet stream;
    generating a third wavelength corresponding to the third selected symbol; and
    modulating the third wavelength with the third optical stream.

4. The method of claim 3, wherein the encoded address further comprises a second group of symbols including n selected symbols, and wherein the method further comprises:
    generating n optical streams in accordance with the input packet stream;
    generating n wavelengths corresponding to the n selected symbols; and
    modulating the n wavelengths with the n optical streams.

5. The method of claim 3, wherein the first group of symbols includes n selected symbols selected from M symbols, wherein M is an integer and n is an integer less than M, and wherein the method further comprises:
    generating n wavelengths corresponding to the n selected symbols comprising
        generating the first wavelength in accordance with the first selected symbol, and
        generating the second wavelength corresponding to the second selected symbol; and
    modulating the n wavelengths with the input packet stream comprising
        modulating the first wavelength with the first optical stream, and
        modulating the second wavelength with the second optical stream.

6. The method of claim 1, wherein the first group of symbols has $2^k$ symbols, wherein k is an integer greater than 1.

7. A method comprising:
    splitting an input optical packet stream having a plurality of wavelengths to a first optical stream and a second optical stream;
    separating the first optical stream into a first group of optical streams by wavelength, wherein the first group of optical streams is more than two optical streams;
    detecting whether optical power in streams of the first group of optical streams is above a threshold to produce a first plurality of symbols, wherein optical power is detected in an initial optical stream of the first group of optical streams;
    decoding the first plurality of symbols to produce a plurality of decoded symbols; and
    switching data of the second optical stream in accordance with the plurality of decoded symbols.

8. The method of claim 7, further comprising separating the input optical packet stream into a second group of optical streams by wavelength, wherein the second group of optical streams has the same number of optical streams as the first group of optical streams.

9. The method of claim 7, wherein the first group of optical streams has $2^k$ optical streams, and wherein k is an integer greater than 1.

10. The method of claim 7, wherein optical power is detected in another optical stream of the first group of optical streams to produce a second plurality of symbols.

11. The method of claim 10, further comprising decoding the second plurality of symbols.

12. A system for multi-wavelength encoding addresses of an input packet stream, the system comprising:
 a packet stream address reader configured to determine an address of an input optical packet of the input packet stream;
 a first encoder coupled to the packet stream address reader, wherein the first encoder is configured to encode the address to produce a first encoded address comprising a first group of symbols including a first selected symbol, and wherein the first group of symbols has more than two symbols;
 a first plurality of switches coupled to the first encoder;
 a first plurality of wavelength sources coupled to the first plurality of switches; and
 a first optical modulator coupled to the first plurality of switches and configured to receive the input optical packet, wherein the first plurality of switches is configured to couple a first wavelength source of the first plurality of wavelength sources to the first optical modulator, and wherein the first wavelength source corresponds to the first selected symbol.

13. The system of claim 12, wherein the first plurality of switches is configured to couple a second wavelength source of the first plurality of wavelength sources to the first optical modulator.

14. The system of claim 12, further comprising:
 a second encoder coupled to the packet stream address reader, wherein the second encoder is configured to encode the address to produce a second encoded address comprising a second group of symbols having the same number of symbols as the first group of symbols;
 a second plurality of switches coupled to the second encoder; and
 a second plurality of wavelength sources coupled to the second plurality of switches.

15. The system of claim 12, wherein the first encoded address further comprises a second group of symbols including a second selected symbol, wherein the first group of symbols has the same number of symbols as the second group of symbols, and wherein the system further comprises:
 a second plurality of switches coupled to the packet stream address reader; and
 a second plurality of wavelength sources coupled to the second plurality of switches.

16. The system of claim 15, further comprising:
 an inverse multiplexer coupled to the packet stream address reader and the first optical modulator; and
 a second optical modulator coupled to the inverse multiplexer and the second plurality of switches, wherein the second plurality of switches is configured to couple the second plurality of wavelength sources to the second optical modulator, and wherein a second wavelength source corresponds to the second selected symbol.

17. A system comprising:
 a splitter configured to split an input optical stream into a first optical stream and a second optical stream;
 a first optical filter configured to separate by wavelength the first optical stream to produce a first group of optical streams comprising more than two optical streams;
 a first plurality of optical detectors coupled to the first optical filter configured to detect power in the first group of optical streams and detect power in an initial optical stream of the first group of optical streams;
 a switch coupled to the first plurality of optical detectors configured to switch the second optical stream with the first group of optical streams; and
 a first decoder coupled between the first plurality of optical detectors and the switch.

18. The system of claim 17, further comprising:
 a second optical filter configured to separate by wavelength the first optical stream to produce a second group of optical streams, wherein the second group of optical streams has the same number of streams as the first group of optical streams; and
 a second plurality of optical detectors coupled to the second optical filter configured to detect power in the second group of optical streams.

19. The system of claim 18, further comprising:
 a second decoder coupled to the second plurality of optical detectors.

20. The system of claim 17, wherein the first plurality of optical detectors is further configured to detect power in the second optical stream of the first group of optical streams.

21. The system of claim 17, wherein the first group of optical streams has $2^k$ optical streams, and wherein k is an integer greater than 1.

* * * * *